US012630728B2

(12) United States Patent
Asakawa et al.

(10) Patent No.: US 12,630,728 B2
(45) Date of Patent: May 19, 2026

(54) INK SET AND RECORDING METHOD

(71) Applicant: SEIKO EPSON CORPORATION,
Tokyo (JP)

(72) Inventors: Yuta Asakawa, Azumino (JP);
Mitsuaki Kosaka, Minowa (JP)

(73) Assignee: SEIKO EPSON CORPORATION (JP)

( * ) Notice: Subject to any disclaimer, the term of this
patent is extended or adjusted under 35
U.S.C. 154(b) by 884 days.

(21) Appl. No.: 17/858,125

(22) Filed: Jul. 6, 2022

(65) Prior Publication Data

US 2023/0023979 A1 Jan. 26, 2023

(30) Foreign Application Priority Data

Jul. 7, 2021 (JP) ................................. 2021-112611

(51) Int. Cl.
| | |
|---|---|
| *C09D 11/322* | (2014.01) |
| *B41M 5/00* | (2006.01) |
| *C09D 11/36* | (2014.01) |
| *C09D 11/40* | (2014.01) |

(52) U.S. Cl.
CPC ......... *C09D 11/322* (2013.01); *B41M 5/0011*
(2013.01); *B41M 5/0047* (2013.01); *C09D*
*11/36* (2013.01); *C09D 11/40* (2013.01)

(58) Field of Classification Search
CPC ....... C09D 11/322; C09D 11/36; C09D 11/40;
C09D 11/38; C09D 11/54; C09D 11/30;
B41M 5/0011; B41M 5/0047; B41M
5/0017; B41M 7/009; B41M 5/0023
See application file for complete search history.

(56) References Cited

U.S. PATENT DOCUMENTS

| | | | |
|---|---|---|---|
| 2003/0035034 A1* | 2/2003 | Fukumoto | .............. C09D 11/40 |
| | | | 347/100 |
| 2003/0071883 A1* | 4/2003 | Suzuki | ................... C09D 11/40 |
| | | | 347/100 |
| 2005/0124726 A1 | 6/2005 | Yatake et al. | |
| 2019/0092958 A1 | 3/2019 | Okuda et al. | |
| 2019/0284425 A1* | 9/2019 | Okuda | ................. C09D 11/106 |
| 2019/0284426 A1* | 9/2019 | Matsuzaki | ............. C09D 11/38 |

FOREIGN PATENT DOCUMENTS

| | | | | |
|---|---|---|---|---|
| JP | H08-302256 A | | 11/1996 | |
| JP | 2000043399 A | * | 2/2000 | ............ B41J 2/2114 |
| JP | 2005-271271 A | | 10/2005 | |
| JP | 2008-069355 A | | 3/2008 | |
| JP | 2008-231342 A | | 10/2008 | |
| JP | 2019-059872 A | | 4/2019 | |

OTHER PUBLICATIONS

English machine translation of JP-2000043399-A (Year: 2000).*

* cited by examiner

*Primary Examiner* — Amber R Orlando
*Assistant Examiner* — Jeffrey Eugene Barzach
(74) *Attorney, Agent, or Firm* — Harness, Dickey &
Pierce, P.L.C.

(57) ABSTRACT

An ink set according to the present disclosure includes: a
treatment liquid containing an aggregating agent; a deep ink
composition; and a light ink composition, the ink composi-
tions containing colorants, belonging to the same color
system, and each being a water-based ink jet ink, the light
ink composition contains an organic solvent which is a
condensate of an alkanediol having 2 or 3 carbon atoms and
which has two hydroxy groups, and the deep ink composi-
tion contains an organic solvent which is an alkanediol
having 2 to 4 carbon atoms.

11 Claims, 2 Drawing Sheets

INK SET AND RECORDING METHOD

The present application is based on, and claims priority from JP Application Serial Number 2021-112611, filed Jul. 7, 2021, the disclosure of which is hereby incorporated by reference herein in its entirety.

BACKGROUND

1. Technical Field

The present disclosure relates to an ink set and a recording method.

2. Related Art

An ink jet recording method to record an image on a recording medium by ejecting fine ink droplets from nozzles of an ejection head of an ink jet recording apparatus has been known. In recent years, for example, an ink jet recording method has also been used for recording of an image not only on a recording medium, such as regular paper, having an excellent ink absorbing property but also on a low-absorbing recording medium, such as art paper or coated paper, having a low ink absorbing property and a non-absorbing recording medium, such as a plastic film, hardly having an ink absorbing property. In addition, in the recording of an image on a low-absorbing recording medium or a non-absorbing recording medium as described above, a water-based ink jet ink (hereinafter, referred to as "water-based ink" in some cases) using water as a base component has also become to be used.

In the recording using a water-based ink, in order to prevent degradation in image quality caused by gathering and bleeding of ink droplets on a recording medium, a technique in which a water-based ink and a treatment liquid to aggregate components of the ink are used in combination has been known. In addition, in recent years, there has been a technique in which in order to form an mage having a high gradation property, as the water-based ink to be used together with the treatment liquid, a deep ink and a light ink which belong to the same color system but have different color densities are used in combination (for example, see JP-A-2019-059872).

However, although the treatment liquid was used, an image quality of the light ink was not sufficient. In addition, while the image quality of the light ink is improved, ejection characteristics of the light ink are difficult to coincide with those of the deep ink, and when the deep ink and the light ink (hereinafter, referred to as "the deep and the light inks" in some cases) are ejected at the same time, a problem in that landing positions of the deep ink droplets and landing positions of the light ink droplets deviate from each other may arise. That is, in the past, while an excellent image quality was obtained using a treatment liquid, a deep ink, and a light ink, deviation between landing positions (landing deviation) of deep ink droplets and light ink droplets could not be significantly reduced.

SUMMARY

According to an aspect of the present disclosure, there is provided an ink set comprising: a treatment liquid containing an aggregating agent; a deep ink composition; and a light ink composition, the ink compositions containing colorants, belonging to the same color system, and each being a water-based ink jet ink. In the ink set described above, the light ink composition contains an organic solvent which is a condensate of an alkanediol having 2 or 3 carbon atoms and which has two hydroxy groups, and the deep ink composition contains an organic solvent which is an alkanediol having 2 to 4 carbon atoms.

According to another aspect of the present disclosure, there is provided a recording method using the ink set according to the aspect described above, the method comprising: a step of adhering the treatment liquid to a recording medium; and a step of adhering the light ink composition and the deep ink composition to the recording medium by an ink jet method.

DESCRIPTION OF EXEMPLARY EMBODIMENTS

Figure 1:
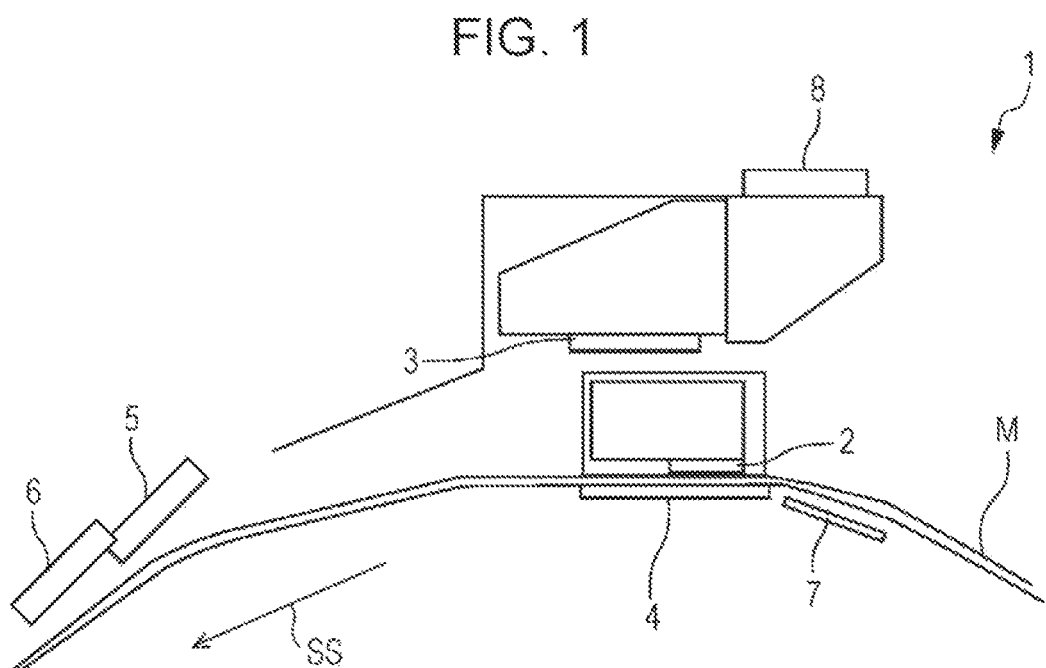
FIG. 1 is a schematic cross-sectional view of an example of an ink jet recording apparatus.

Hereinafter, embodiments of the present disclosure will be described. The following embodiments will describe examples of the present disclosure. The present disclosure is not limited at all to the following embodiments and includes variously changed and/or modified embodiments to be performed without departing from the scope of the present disclosure. In addition, all the components to be described below are not always required to be essential components of the present disclosure.

1. Ink Set

An ink set according to an embodiment of the present disclosure comprises: a treatment liquid containing an aggregating agent; a deep ink composition; and a light ink composition, the ink compositions containing colorants, belonging to the same color system, and each being a water-based ink jet ink. In the ink set described above, the light ink composition contains an organic solvent which is a condensate of an alkanediol having 2 or 3 carbon atoms and which has two hydroxy groups, and the deep ink composition contains an organic solvent which is an alkanediol having 2 to 4 carbon atoms.

By the ink set according to this embodiment, an excellent image quality can be obtained, and in addition, the landing deviation can be significantly reduced.

Since a content of the colorant functioning as an aggregating component in the light ink is generally low as compared to a content thereof in the deep ink, a reactivity of the light ink with the treatment liquid is low as compared to that of the deep ink, and as a result, an image quality to be obtained is liable to be insufficient. In addition, even if the image quality of the light ink can be improved, the ejection characteristics of the light ink are difficult to coincide with those of the deep ink, and when those two types of inks are ejected at the same time, the landing deviation therebetween may be disadvantageously generated.

According to this embodiment, when the organic solvent which is a condensate of an alkanediol having 2 or 3 carbon atoms and which has two hydroxy groups (hereinafter, referred to as "specific condensate" in some cases) is contained in the light ink composition, an excellent image quality can be obtained. The reason for this is estimated that since a specific condensate having a relatively high viscosity is contained, as the light ink composition is being dried on a recording medium, the viscosity of the ink is significantly increased, and as a result, movement of ink droplets is suppressed. That is, by a fixing effect (pinning effect) of the ink droplets on the recording medium by a reaction with the treatment liquid, and by a pinning effect by the increase in viscosity of the ink droplets themselves, the ink droplets can be fixed before gathering together and bleeding, and hence, it is estimated that an excellent image quality can be obtained.

Furthermore, since the organic solvent which is an alkane-diol having 2 to 4 carbon atoms (hereinafter, referred to as "specific monomer" in some cases) is contained in the deep ink composition, the ejection characteristics of the deep ink composition can be made to coincide with those of the light ink composition, and as a result, the landing deviation can be significantly reduced. The reason for this is estimated that since the specific condensate contained in the light ink composition is a compound similar to the specific monomer contained in the deep ink composition, the ejection charac-teristics (in particular, the viscosities) of the two types of ink compositions are made to be similar to each other. In addition, the reason for this is also estimated that although the viscosity tends to be decreased when a content of the colorant contained in the ink is low, when the specific condensate is contained in the light ink composition, the viscosity thereof is made appropriate, and as a result, the ejection characteristics of the two types of ink compositions are likely to coincide with each other.

The "ink set" in the present disclosure indicates a deep ink composition, a light ink composition, and a treatment liquid which are used for recording as a set. That is, the ink set is an ink set including the deep ink composition, the light ink composition, and the treatment liquid which are used in combination for recording.

The deep ink composition, the light ink composition, and the treatment liquid included in the ink set may be received in either a separate type liquid container or an integrated type liquid container.

The ink set includes at least one (type) deep ink compo-sition, at least one (type) light ink composition, and at least one (type) treatment liquid. At least two types of deep ink compositions, at least two types of light ink compositions, and at least two types of treatment liquids may also be included. In addition, the deep ink composition and the light ink composition are each a water-based ink jet ink and are each used for recording by being ejected from an ink jet head by an ink jet method.

Hereinafter, the deep ink composition, the light ink com-position, and the treatment liquid included in the ink set according to this embodiment will be described.

1.1. Deep Ink Composition and Light Ink Composition

The deep ink composition and the light ink composition included in the ink set according to this embodiment contain colorants, belong to the same color system, and are each a water-based ink jet ink. The light ink composition contains an organic solvent which is a condensate of an alkanediol having 2 or 3 carbon atoms and which has two hydroxy groups, and the deep ink composition contains an organic solvent which is an alkanediol having 2 to 4 carbon atoms.

The content of the colorant in the light ink composition is preferably lower than the content of the colorant in the deep ink composition on a mass basis. That is, an ink in which the content of the colorant is high on a mass basis is preferably used as the deep ink composition, and an ink in which the content of the colorant is lower on a mass basis than that in the deep ink composition is preferably used as the light ink composition.

"The light ink composition and the deep ink composition belong to the same color system" indicates that the two ink compositions have hue angles similar to each other and that the difference in hue angle $\angle H°$ between images recorded on a white recording medium by the light ink composition and the deep ink composition is 30° or less. The hue angle $\angle H°$ is defined in the CIELAB color space and is obtained by $\angle H°=\tan^{-1}(b*/a*)+180$ (in the case of a*<0) or by $\angle H°=\tan^{-1}(b*/a*)+360$ (in the case of a*>0). The difference in $\angle H°$ is preferably 20° or less and more preferably 10° or less.

In addition, a* and b* each indicate the chromaticness index defined in the CIELAB color space.

"The light ink composition and the deep ink composition belong to the same color system" indicates that those ink compositions are considered to have tints similar to each other. For example, a combination between a cyan ink and a light cyan ink (also called a photo cyan ink), a combination between a magenta ink and a light magenta ink (also called a photo magenta ink), and a combination between a yellow ink and a light yellow ink may be mentioned. In addition, a combination between a gray ink and a black ink may also be mentioned. As described above, "the ink compositions belong to the same color system" suggests a combination between a deep ink and a light ink which have tints similar to each other but have color densities different from each other.

In addition, a light ink composition and a deep ink composition which contain only the same colorant at dif-ferent contents may be regarded as the inks which belong to the same color system.

Hereinafter, components contained in the light ink com-position and the deep ink composition included in the ink set according to this embodiment will be described. In addition, the light ink composition and the deep ink composition each may be called the "ink composition" in some cases.

1.1.1. Water

The light ink composition and the deep ink composition included in the ink set according to this embodiment are each a water-based ink jet ink and each contain water. In addition, the "water-based" of the "water-based" ink jet ink in the present disclosure indicates that at least water is used as a primary solvent.

A content of the organic solvent in the "water-based" composition with respect to a total mass (100 percent by mass) of the composition is preferably 40 percent by mass or less, more preferably 30 percent by mass or less, even more preferably 25 percent by mass or less, and further preferably 20 percent by mass or less. A content of the water in the composition with respect to the total mass of the composition is preferably 45 percent by mass or more, more preferably 50 percent by mass or more, even more prefer-ably 60 percent by mass or more, and further preferably 70 percent by mass or more.

The water is not particularly limited, and for example, pure water, such as ion exchange water, ultrafiltration water, reverse osmosis water, or distilled water or water, such as ultrapure water, in which ionic impurities are removed as much as possible may be mentioned. In addition, when water sterilized by ultraviolet radiation, addition of hydro-gen peroxide, or the like is used, generation of fungi and/or bacteria can be prevented when the ink composition is stored for a long time. As a result, a storage stability tends to be further improved.

1.1.2. Colorant

The light ink composition and the deep ink composition included in the ink set according to this embodiment each contain a colorant.

As the colorant, although a dye and/or a pigment may be used, a pigment having a discoloration resistance against light, gas, and the like is preferably used. An image formed on a recording medium using a pigment is excellent not only in image quality but also in water resistance, gas resistance, light resistance, and the like, and hence the storage stability is improved. The properties as described above become particularly significant when an image is formed on a non-absorbing or a low-absorbing recording medium. In addition, in this embodiment, the light ink composition and the deep ink composition may contain either the same colorant or different colorants.

Pigment

As the pigment, for example, there may be mentioned an organic pigment, such as a cyan, a magenta, a yellow, or a black pigment, or a special color pigment, such as a white pigment or a bright pigment.

As the organic pigment, for example, there may be mentioned a quinacridone-based pigment, a quinacridone quinone-based pigment, a dioxane-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolo-pyrrole-based pigment, a perinone-based pigment, a quinophthalone-based pigment, an anthraquinone-based pigment, a thioindigo-based pigment, a benzimidazolone-based pigment, a thioindigo-based pigment, an isoindolinone-based pigment, an azomethine-based pigment, a dye chelate, a dye lake, a nitro-based pigment, a nitroso-based pigment, an aniline black, or an azo pigment, such as an insoluble azo pigment, a condensed azo pigment, an azo lake, or a chelate azo pigment.

As a concrete example of the organic pigment, the following may be mentioned.

As the cyan pigment, for example, C.I. Pigment Blue 1, 2, 3, 15:3, 15:4, 16, 22, or 60, or C.I. Vat Blue 4 or 60 may be mentioned, and one selected from the group consisting of C.I. Pigment Blue 15:3, 15:4, and 60 or a mixture of at least two thereof is preferable.

As the magenta pigment, for example, C.I. Pigment Red 5, 7, 12, 48 (Ca), 48 (Mn), 57(Ca), 57:1, 112, 122, 123, 168, 184, 202, or 209, or C.I. Pigment Violet 19 may be mentioned, and one selected from the group consisting of C.I. Pigment Red 122, 202, and 209, and C.I. Pigment Violet 19 or a mixture of at least two thereof is preferable.

As the yellow pigment, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, or 185 may be mentioned, and one selected from the group consisting of C.I. Pigment Yellow 74, 109, 110, 128, 138, 150, and 180 or a mixture of at least two thereof is preferable.

As the orange pigment, for example, C.I. Pigment Orange 36 or 43 or a mixture thereof may be mentioned.

As the green pigment, for example, C.I. Pigment Green 7 or 36 or a mixture thereof may be mentioned.

As the black pigment, for example, a furnace black, a lamp black, an acetylene black, or a channel black (C.I. Pigment Black 7) may be mentioned, and as a commercially available product thereof, for example, there may be mentioned No. 2300, No. 900, MCF88, No. 20B, No. 33, No. 40, No. 45, No. 52, MA7, MA8, MA100, or No. 2200B (trade name, manufactured by Mitsubishi chemical Co., Ltd.);

Color Black FW1, FW2, FW2V, FW18, FW200, S150, S160, or S170, Printex 35, U, V, or 140U, or Special Black 6, 5, 4A, 4, or 250 (trade name, manufactured by Degussa AG.); Conductex SC, Raven 1255, 5750, 5250, 5000, 3500, 1255, or 700 (trade name, manufactured by Columbia Carbon Inc.); or Regal 400R, 330R, or 660R, Mogul L, Monarch 700, 800, 880, 900 1000, 1100, 1300, or 1400, or Elftex 12 (trade name, manufactured by Cabot Corporation). Those carbon blacks may be used alone, or at least two types thereof may be used as a mixture.

Although the bright pigment is not particularly limited as long as having a bright property when being adhered to a medium, for example, there may be mentioned metal particles (also called a metal pigment) of one selected from the group consisting of aluminum, silver, gold, platinum, nickel, chromium, tin, zinc, indium, titanium, copper, and an alloy containing at least two of those mentioned above or a pearl pigment having pearly glossiness. As a representative example of the pearl pigment, for example, a pigment, such as titanium dioxide-coated mica, argentine, or bismuth oxychloride, having pearly glossiness or interference glossiness may be mentioned. In addition, the bright pigment may be surface-treated in order to suppress a reaction with water.

In addition, as the white pigment, for example, a metal oxide or a metal compound, such as barium sulfate or calcium carbonate, may be mentioned. As the metal oxide, for example, titanium dioxide, zinc oxide, silica, alumina, or magnesium oxide may be mentioned. In addition, as the white pigment, particles each having a hollow structure may also be used.

The pigments mentioned above may be used alone, or at least two types thereof may be used in combination. In view of the storage stability, such as a light resistance, a weather resistance, and/or a gas resistance, the pigment is preferably an organic pigment.

Pigment Dispersion

The pigment described above is preferably present in a dispersed state, that is, in the form of a pigment dispersion, in the ink composition. In addition, the pigment dispersion in this specification indicates a dispersion which includes a pigment dispersion liquid and a pigment slurry (low viscous aqueous dispersion).

Although the pigment dispersion is not particularly limited, for example, a self-dispersible pigment, a polymer-dispersible pigment, or a polymer-coated pigment may be mentioned.

Self-Dispersible Pigment

The self-dispersible pigment is a pigment which can be dispersed or dissolved in an aqueous medium with no dispersant. In addition, "to be dispersed or dissolved in an aqueous medium with no dispersant" indicates a state in which the pigment is stably present in an aqueous medium by a hydrophilic group present on the surface thereof without using a dispersant to disperse the pigment. Hence, foaming by degradation in defoaming property caused by the dispersant hardly occurs, and as a result, an ink excellent in ejection stability is likely to be prepared. In addition, since a large increase in viscosity caused by the dispersant can be suppressed, a large amount of the pigment can be contained, and for example, the printing density can be significantly increased, so that the handling can be easily performed.

As the hydrophilic group described above, for example, at least one selected from the group consisting of $-OM$, $-COOM$, $-CO-$, $-SO_3M$, $-SO_2M$, $-SO_2NH_2$, $-RSO_2M$, $-PO_3HM$, $-PO_3M_2$, $-SO_2NHCOR$, $-NH_3$, and $-NR_3$ is preferable.

In addition, in the chemical formulas described above, M represents a hydrogen atom, an alkali metal, ammonium, a substituted or unsubstituted phenyl group, or an organic ammonium, R represents an alkyl group having 1 to 12 carbon atoms or a substituted or unsubstituted naphthyl group. In addition, the above M and R are each independently selected.

The self-dispersible pigment is manufactured such that the hydrophilic group described above is bonded (grafted) on the surface of the pigment, for example, by performing a physical treatment or a chemical treatment thereon. As the physical treatment, for example, a vacuum plasma treatment or the like may be mentioned. In addition, as the chemical treatment, for example, there may be mentioned a wet oxidation method in which oxidation is performed in water by an oxidant or a method in which a carboxy group is bonded to the pigment surface with a phenyl group interposed therebetween by bonding p-aminobenzoic acid thereto.

Polymer Dispersible Pigment

The polymer dispersible pigment is a pigment dispersible by polymer dispersion. Although a polymer used for the polymer dispersible pigment is not particularly limited to those mentioned below, for example, a glass transition temperature (Tg) of a dispersible polymer to be used for dispersion of the pigment is preferably 80° C. or less and more preferably 70° C. or less. When the Tg described above is 80° C. or less, a fixing property of the ink may be improved in some cases.

A weight average molecular weight of the polymer described above measured by a gel permeation chromatography (GPC) is preferably 10,000 to 200,000. Accordingly, the storage stability of the ink may be further improved in some cases. In addition, the weight average molecular weight (Mw) in this specification may be measured as a weight average molecular weight on a polystyrene conversion basis by a gel permeation chromatography (GPC) of L7100 System (manufactured by Hitachi, Ltd.).

Since the fixing property and the glossiness of the ink tend to be further improved, as the polymer described above, a polymer containing as a constituent component, at least 70 percent by mass of a copolymer between a (meth)acrylate and (meth)acrylic acid is preferable. The polymer described above is preferably obtained by polymerization from a monomer component which contains at least 70 percent by mass of one of an alkyl (meth)acrylate having 1 to 24 carbon atoms and a cyclic alkyl (meth)acrylate having 3 to 24 carbon atoms. Although a concrete example of the monomer component described above is not particularly limited, for example, there may be mentioned methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, or behenyl (meth)acrylate. In addition, as another polymerization monomer component, for example, a hydroxy (meth)acrylate, such as hydroxyethyl (meth)acrylate, hydroxypropyl (meth)acrylate, or diethylene glycol (meth)acrylate, having a hydroxy group, an urethane (meth) acrylate, or an epoxy (meth)acrylate may also be used.

In addition, in this specification, "(meth)acryl" indicates at least one of acryl and methacryl. "(Meth)acrylate" indicates at least one of acrylate and methacrylate.

Polymer-Coated Pigment

In addition, since the fixing property, the glossiness, and the color reproducibility of the ink tend to be improved, among the polymer dispersible pigments described above, a polymer-coated pigment, that is, a microencapsulated pigment, is preferably used.

The polymer-coated pigment described above is a pigment obtained by a phase transfer emulsification method. That is, the polymer described above is dissolved in an organic solvent, such as methanol, ethanol, isopropyl alcohol, n-butanol, acetone, methyl ethyl ketone, or dibutyl ether. After the pigment is added to the solution thus obtained, a neutralizer and water are added, and a kneading/dispersing treatment is then performed, so that an oil-in-water type dispersion is prepared. Subsequently, the organic solvent is removed from the dispersion thus obtained, so that a polymer-coated pigment can be obtained as a water dispersion. The kneading/dispersing treatment may be performed, for example, using a ball mill, a roll mill, a bead mill, a high-pressure homogenizer, or a high-speed stirring type disperser.

As the neutralizer, for example, ethylamine, a tertiary amine such as triethylamine, lithium hydroxide, sodium hydroxide, potassium hydroxide, or ammonia is preferable. The water dispersion thus obtained preferably has a pH of 6 to 10.

As the polymer to coat the pigment, a polymer having a weight average molecular weight of approximately 10,000 to 150,000 measured by a GPC method is preferable since the pigment can be stably dispersed.

Dye

In the light ink composition and the deep ink composition, the dye may also be used as the colorant. The dye is not particularly limited, and for example, an acidic dye, a direct dye, a reactive dye, a basic dye, or a dispersive dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 132, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, 141, or 249, or C.I. Reactive Black 3, 4, or 35.

The colorants may be used alone, or at least two types thereof may be used in combination.

A content of the colorant in the light ink composition with respect to a total mass of the light ink composition is preferably 0.1 percent by mass or more, more preferably 0.3 percent by mass or more, even more preferably 0.5 percent by mass or more, and further preferably 0.7 percent by mass or more. In addition, the content of the colorant in the light ink composition with respect to the total mass of the light ink composition is preferably 10 percent by mass or less, more preferably 5 percent by mass or less, even more preferably 3 percent by mass or less, further preferably 2 percent by mass or less, and particularly preferably 1.5 percent by mass or less.

A content of the colorant in the deep ink composition with respect to a total mass of the deep ink composition is preferably 0.5 percent by mass or more, more preferably 1 percent by mass or more, even more preferably 2 percent by mass or more, and further preferably 3 percent by mass or more. In addition, the content of the colorant in the deep ink composition with respect to the total mass of the deep ink composition is preferably 15 percent by mass or less, more preferably 10 percent by mass or less, even more preferably 7 percent by mass or less, and further preferably 5 percent by mass or less.

In addition, as described above, the content of the colorant in the light ink composition is preferably lower than the content of the colorant in the deep ink composition.

The content of the colorant in the light ink composition is lower than the content of the colorant in the deep ink composition on a mass basis preferably by 0.5 percent by mass or more, more preferably by 1 to 6 percent by mass, and further preferably by 2 to 5 percent by mass.

1.1.3. Organic Solvent

In the ink set according to this embodiment, the light ink composition contains an organic solvent (specific condensate) which is a condensate of an alkanediol having 2 or 3 carbon atoms and which has two hydroxy groups, and the deep ink composition contains an organic solvent (specific monomer) which is an alkanediol having 2 to 4 carbon atoms.

1.1.3.1. Specific Condensate

The light ink composition contains an organic solvent (specific condensate) which is a condensate of an alkanediol having 2 or 3 carbon atoms and which has two hydroxy groups.

The specific condensate is a condensate of at least two molecules of an alkanediol having 2 or 3 carbon atoms. This condensate is a condensate obtained by intermolecular condensation between hydroxy groups.

Among the specific condensates, as a specific condensate of an alkanediol having 2 carbon atoms and which has 2 hydroxy groups, for example, diethylene glycol (standard boiling point: 244° C., condensation number: 2), triethylene glycol (standard boiling point: 276° C., condensation number: 3), tetraethylene glycol (standard boiling point: 328° C., condensation number: 4), or pentaethylene glycol (standard boiling point: 184° C., condensation number: 5) may be mentioned.

Among the specific condensates, as a specific condensate of an alkanediol having 3 carbon atoms and which has 2 hydroxy groups, for example, dipropylene glycol (standard boiling point: 232° C., condensation number: 2), tripropylene glycol (standard boiling point: 270° C., condensation number: 3), tetrapropylene glycol (condensation number: 4), or pentapropylene glycol (condensation number: 5) may be mentioned.

The condensation number of the specific condensate is preferably 2 to 5 and more preferably 2 to 3. In addition, the "condensation number" indicates the number of condensed moles of an alkanediol having 2 or 3 carbon atoms.

A standard boiling point of the specific condensate is preferably 150° C. to 300° C. and more preferably 150° C. to 250° C. In addition, the standard boiling point of the specific condensate is preferably 200° C. to 300° C., more preferably 210° C. to 250° C., and further preferably 200° C. to 240° C.

Furthermore, the organic solvent (specific condensate), which is a condensate of an alkanediol having 2 or 3 carbon atoms and which has two hydroxy groups, contained in the light ink composition and the organic solvent (specific monomer), which is an alkanediol having 2 to 4 carbon atoms, contained in the deep ink composition which will be described later each have a standard boiling point of preferably 150° C. to 300° C. and more preferably 150° C. to 250° C.

When the standard boiling points of the respective organic solvents are in the range described above, a drying property of the ink is further improved, and an abrasion resistance tends to be further improved.

A content of the specific condensate in the light ink composition with respect to the total mass of the light ink composition is preferably 0.50 percent by mass or more, more preferably 1.0 percent by mass or more, even more preferably 1.5 percent by mass or more, and further preferably 3.0 percent by mass or more. In addition, the content of the specific condensate in the light ink composition with respect to the total mass of the light ink composition is preferably 15 percent by mass or less, more preferably 10 percent by mass or less, even more preferably 8.0 percent by mass or less, further preferably 6.0 percent by mass or less, and particularly preferably 5.0 percent by mass or less.

The specific condensate may be or may not be contained in the deep ink composition. However, in the deep ink composition, the organic solvent (specific condensate) which is a condensate of an alkanediol having 2 or 3 carbon atoms and which has 2 hydroxy groups is preferably not contained at a content higher than that of the organic solvent (specific condensate) which is a condensate of an alkanediol having 2 or 3 carbon atoms and which has 2 hydroxy groups in the light ink composition. Furthermore, the deep ink composition is preferably configured not to contain the specific condensate at a content equal to or higher than that of the specific condensate in the light ink composition.

Furthermore, a content of the specific condensate in the deep ink composition is lower than the content of the specific condensate in the light ink composition preferably by 1 percent by mass or more and more preferably by 3 percent by mass or more.

In addition, the deep ink composition is preferably configured not to contain the specific condensate at a content equal to or higher than a content of the specific monomer in the deep ink composition which will be described later. Furthermore, the content of the specific condensate in the deep ink composition is lower than the content of the specific monomer in the deep ink composition preferably by 3 percent by mass or more, more preferably by 5 percent by mass or more, even more preferably by 7 percent by mass or more, and further preferably by 10 percent by mass or more.

In addition, the deep ink composition more preferably contains no specific condensate.

Since the specific condensate has a high moisture retaining property, a clogging recovery property of the ink containing the specific condensate tends to be further improved. On the other hand, since the deep ink composition is frequently used at a high duty, when the specific condensate is contained therein, a sufficient drying property may not be secured, and as a result, the abrasion resistance may be degraded in some cases. In addition, when the ink contains the colorant, since the landing deviation tends to be easily generated in the recording, the specific condensate which increases the viscosity is preferably not used in the deep ink composition, and even if the specific condensate is used therein, the content of the specific condensate is preferably decreased.

In addition, in this specification, the "duty" indicates a value calculated by the following equation (1).

$$\text{Duty (\%)} = \{\text{number of actual printing dots}/(\text{vertical resolution} \times \text{horizontal resolution})\} \times 100 \qquad (1)$$

In the equation, the "number of actual printing dots" indicates the number of actual printing dots per unit area, and the "vertical resolution" and the "horizontal resolution" each indicate a resolution per unit area.

In addition, the content of the specific condensate in the deep ink composition with respect to the total mass of the deep ink composition is preferably 4.0 percent by mass or less, more preferably 2.0 percent by mass or less, even more preferably 1.0 percent by mass or less, further preferably 0.50 percent by mass or less, and particularly preferably 0 percent by mass.

1.1.3.2. Specific Monomer

The deep ink composition contains an organic solvent (specific monomer) which is an alkanediol having 2 to 4 carbon atoms. In addition, since the specific monomer as described above is a compound similar to the specific condensate contained in the light ink composition, those two compounds have good compatibility with each other, and a uniform image tends to be obtained.

As the specific monomer, for example, ethylene glycol (standard boiling point: 197° C.), propylene glycol (standard boiling point: 188° C.), 1,2-butanediol (standard boiling point: 192° C.), 1,3-propanediol (standard boiling point: 214° C.), 1,3-butanediol (standard boiling point: 207° C.), 1,4-butanediol (standard boiling point: 235° C.), 2,3-butanediol (standard boiling point: 182° C.), or 2-methyl-1,3-propanediol (standard boiling point: 214° C.) may be mentioned. Among those monomers mentioned above, an organic solvent which is an alkanediol having 2 or 3 carbon atoms is preferable.

A standard boiling point of the specific monomer is preferably 150° C. to 300° C. and more preferably 150° C. to 250° C. In addition, the standard boiling point of the specific monomer is preferably 150° C. to 240° C., more preferably 150° C. to 200° C., and further preferably 150° C. to 190° C.

The content of the specific monomer in the deep ink composition with respect to the total mass of the deep ink composition is preferably 1.0 percent by mass or more, more preferably 3.0 percent by mass or more, even more preferably 5.0 percent by mass or more, and further preferably 8.0 percent by mass or more. In addition, the content of the specific monomer in the deep ink composition with respect to the total mass of the deep ink composition is preferably 20 percent by mass or less, more preferably 18 percent by mass or less, even more preferably 16 percent by mass or less, and further preferably 14 percent by mass or less.

In addition, since the deep ink composition contains the specific monomer, the abrasion resistance tends to be improved. The reason for this is that compared to an organic solvent, such as the specific condensate described above, the specific monomer has a low standard boiling point, and hence, the ink is superior in drying property. Since the drying property is excellent, as the specific monomer, an organic solvent which is an alkanediol having 2 or 3 carbon atoms is preferable.

In addition, although the specific monomer has a low pinning effect as compared to that of the specific condensate, the deep ink composition is superior to the light ink composition in terms of reactivity with the treatment liquid, and hence, an excellent image quality can be obtained.

The specific monomer may be or may not be contained in the light ink composition. However, the light ink composition preferably contains an organic solvent (specific monomer) which is an alkanediol having 2 to 4 carbon atoms.

A content of the specific monomer in the light ink composition is preferably higher than the content of the specific condensate therein.

That is, in the light ink composition, the content of the organic solvent (specific condensate) which is a condensate of an alkanediol having 2 or 3 carbon atoms and which has two hydroxy groups is preferably lower than the content of the organic solvent (specific monomer) which is an alkanediol having 2 to 4 carbon atoms.

Furthermore, the content of the specific condensate in the light ink composition is lower than the content of the specific monomer in the light ink composition preferably by 1 percent by mass or more, more preferably by 2 percent by mass or more, even more preferably by 3 percent by mass or more, and further preferably by 4 to 10 percent by mass.

Although having a high moisture retaining property and an excellent clogging recovery property, the ink containing the specific condensate is liable to be degraded in terms of the drying property and the abrasion resistance. Since the light ink composition is frequently used at a low duty and is likely to be dried, even if containing the specific condensate, the light ink composition is likely to have a preferable abrasion resistance. In addition, when the specific monomer is further contained in the light ink composition, the viscosity and the drying property are appropriately adjusted with a good balance, and the image quality and the abrasion resistance can be preferably obtained at the same time.

Furthermore, the viscosity of the ink containing the specific condensate may be rapidly increased in a nozzle of an ink jet head in some cases, and in this case, the landing deviation is liable to be generated in the recording. In order to prevent this deviation problem, the specific condensate and the specific monomer are preferably used in combination in the light ink composition. In addition, when the two specific compounds described above are used in combination in the light ink composition, the viscosity thereof is likely to coincide with the viscosity of the deep ink composition, and hence, the landing deviation between the deep and the light inks can be preferably further prevented.

On the other hand, the organic solvent (specific monomer) which is an alkanediol having 2 to 4 carbon atoms may be configured not to be contained in the light ink composition at a content higher than the content of the organic solvent (specific monomer) which is an alkanediol having 2 to 4 carbon atoms in the deep ink composition, and in the light ink composition, the specific monomer may be configured not to be contained.

Even in the case described above, according to the ink set of this embodiment, the image quality and prevention of the landing deviation can be preferably obtained at the same time.

In addition, the content of the specific monomer in the light ink composition with respect to the total mass of the light ink composition is preferably 0.1 percent by mass or more, more preferably 1 percent by mass or more, even more preferably 3 percent by mass or more, and further preferably 5 percent by mass or more. In addition, the content of the specific monomer in the light ink composition with respect to the total mass of the light ink composition is preferably 20 percent by mass or less, more preferably 15 percent by mass or less, even more preferably 13 percent by mass or less, and further preferably 11 percent by mass or less. In addition, the content of the specific monomer in the light ink composition may also be 0 percent by mass with respect to the total mass of the light ink composition.

1.1.3.3. Low Molecular Weight Organic Compound

The light ink composition and the deep ink composition included in the ink set according to this embodiment each may contain a low molecular weight organic compound which is one of an amide, a sulfur-containing compound, and a cyclic ether and which has a standard boiling point of 150° C. to 300° C. This low molecular weight organic compound is called a specific low molecular weight organic compound.

Since being one of an amide, a sulfur-containing compound, and a cyclic ether, the specific low molecular weight organic compound as described above has a resin solubility so as to dissolve and/or swell a resin dispersion to be contained in the ink or a recording medium, and hence, the abrasion resistance may be further improved in some cases. In addition, since the specific low molecular weight organic compound as described above has a standard boiling point of 150° C. to 300° C., the ink is likely to be dried in the recording, and the abrasion resistance tends to be further improved.

A molecular weight of the low molecular weight organic compound is preferably 300 or less and more preferably 50 to 200.

Amide

As the amide, for example, a cyclic amide or a non-cyclic amide may be mentioned. As the non-cyclic amide, for example, an alkoxyalkylamide may be mentioned.

As the cyclic amide, a lactam may be mentioned, and for example, there may be mentioned a pyrrolidone, such as 2-pyrrolidone (standard boiling point: 245° C.), 1-methyl-2-pyrrolidone, 1-ethyl-2-pyrrolidone, 1-propyl-2-pyrrolidone, or 1-butyl-2-pyrrolidone; 2-piperidone, ε-caprolactam, N-methyl-ε-caprolactam, N-cyclohexyl-2-pyrrolidone, 5-methyl-2-pyrrolidone, β-propiolactam, ω-heptalactam, or succinimide. Among those mentioned above, in particular, 2-pyrrolidone is more preferable.

As the non-cyclic amide, for example, there may be mentioned an alkoxyalkylamide, such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-prooxy-N,N-methylethylpropionamide, 3-iso-propoxy-N,N-dimethylpropionamide, 3-iso-propoxy-N,N-diethylpropionamide, 3-iso-prooxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide; N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, or N,N-dimethylpropionamide.

Sulfur-Containing Compound

As the sulfur-containing compound, for example, a sulfoxide or a sulfone may be mentioned.

As the sulfoxide, for example, there may be mentioned a non-cyclic sulfoxide, such as dimethyl sulfoxide (standard boiling point: 189° C.) or diethyl sulfoxide; or a cyclic sulfoxide such as tetramethyl sulfoxide. As the sulfone, for example, there may be mentioned a cyclic sulfone, such as 3-methyl sulfolane or sulfolane; or a non-cyclic sulfone, such as ethyl isopropyl sulfone, ethyl methyl sulfone, or dimethyl sulfone.

Cyclic Ether

As the cyclic ether, for example, there may be mentioned tetrahydrofuran, 1,4-dioxane, dimethyl isosorbide, 3-methyl-3-oxetanemethanol, 3-ethyl-3-oxetanemethanol (standard boiling point: 220° C.), 2-hydroxymethyloxetane, tetrahydrofurfuryl alcohol, glycerol formal, solketal, 1,4-dioxane-2,3-diol, or dihydrolevoglucosenone.

A standard boiling point of the low molecular weight organic compound is preferably 150° C. to 300° C., more preferably 150° C. to 270° C., and further preferably 150° C. to 250° C. When the standard boiling point described above is in the range described above, the drying property is further improved, and the abrasion resistance tends to be further improved.

A content of the low molecular weight organic compound with respect to the total mass of the ink composition is preferably 3 to 20 percent by mass, more preferably 5 to 18 percent by mass, even more preferably 7 to 16 percent by mass, and further preferably 9 to 14 percent by mass.

1.1.3.4. Other Organic Solvents

The light ink composition and the deep ink composition included in the ink set according to this embodiment may contain, as an organic solvent other than those described above, a polyvalent alcohol, an ester, an alkylene glycol ether, and/or a cyclic ester.

Polyvalent Alcohol

The polyvalent alcohol is a compound having at least two hydroxy groups in its molecule and includes an alkane polyol in which hydrogen atoms of an alkane are substituted by at least two hydroxy groups or a condensate of an alkanediol obtained by intermolecular condensation between hydroxy groups.

Although the specific condensate and the specific monomer described above also correspond to the polyvalent alcohol, a polyvalent alcohol other than the specific condensate and the specific monomer described above will be described below.

As the polyvalent alcohol, for example, an alkanediol having 5 carbon atoms or more or an organic solvent having at least three hydroxy groups may be mentioned. As the alkanediol having 5 carbon atoms or more, for example, there may be mentioned 1,2-pentanediol, 1,2-hexanediol, 1,2-heptanediol, 1,2-octanediol, 1,5-pentanediol, 1,6-hexanediol, 2-ethyl-2-methyl-1,3-propanediol, 2-methyl-2-propyl-1,3-propanediol, 2,2-dimethyl-1,3-propanediol, 3-methyl-1,3-butanediol, 2-ethyl-1,3-hexanediol, 3-methyl-1,5-pentanediol, or 2-methylpentane-2,4-diol. As the organic solvent having at least three hydroxy groups, for example, trimethylolpropane or glycerin may be mentioned.

Ester

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

Alkylene Glycol Ether

As the alkylene glycol ether, a monoether or a diether of an alkylene glycol is preferable, and an alkyl ether is more preferable. As a particular example, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

Cyclic Ester

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, ε-decanolactone, or a compound in which a hydrogen atom of a methylene group adjacent to a carbonyl group of one of the esters mentioned above is substituted by an alkyl group having 1 to 4 carbon atoms.

The organic solvents mentioned above may be used alone, or at least two types thereof may be used in combination.

In each of the deep ink composition and the light ink composition, a content of the organic solvent with respect to the total mass of the composition is preferably 1 to 40 percent by mass, more preferably 10 to 30 percent by mass, and further preferably 15 to 25 percent by mass. A content of an organic solvent having a standard boiling point of 250° C. or less is also preferably set in the range described above.

In each of the deep ink composition and the light ink composition, the organic solvent having a standard boiling point of 250° C. or less is preferably contained at a content of 10 to 30 percent by mass with respect to the total mass of the composition. An organic solvent having a standard boiling point of more than 250° C. is preferably not contained at a content of more than 8 percent by mass with respect to the total mass of the composition.

In the case described above, the drying property of the ink composition can be appropriately controlled, and the abrasion resistance preferably tends to be further improved. In addition, in general, since an organic solvent has a higher viscosity than that of water and is likely to obtain a pinning effect, a method to increase the content of the organic solvent in the light ink composition may be considered so as to improve the pinning effect; however, when the content of the organic solvent is increased, the drying property is degraded, and the abrasion resistance also tends to be degraded. Hence, when the specific condensate is contained in the light ink composition, and when the content of the organic solvent is set to an upper limit of the range described above or less, and in particular, is set to 30 percent by mass or less, the image quality and the abrasion resistance can be preferably obtained at the same time with a good balance.

In addition, in each of the deep ink composition and the light ink composition, the organic solvent having a standard boiling point of 250° C. or less is contained more preferably at a content of 15 to 30 percent by mass, further preferably at a content of 20 to 30 percent by mass, and particularly preferably at a content of 26 to 30 percent by mass with respect to the total mass of the composition.

In addition, in each of the deep ink composition and the light ink composition, the organic solvent having a standard boiling point of more than 250° C. is not contained more preferably at a content of more than 5 percent by mass, even more preferably at a content of more than 3 percent by mass, further preferably at a content of more than 1 percent by mass, and particularly preferably at a content of more than 0.5 percent by mass with respect to the total mass of the composition, and the organic solvent described above is more particularly preferably not contained.

In addition, in each of the deep ink composition and the light ink composition, a content of a polyvalent alcohol having a standard boiling point of more than 250° C. is preferably set in the range described above.

In addition, although the organic solvent may include the specific condensate, the specific monomer, the specific low molecular weight organic compound, and the other organic solvents, those compounds described above are required to be in the form of a liquid at ordinary temperature. The organic solvent is preferably a water-soluble organic solvent.

1.1.4. Alkanolamine

The light ink composition and the deep ink composition included in the ink set according to this embodiment each may contain an alkanolamine, and a content of the alkanolamine in the light ink composition is preferably higher than a content of the alkanolamine in the deep ink composition.

The alkanolamine is able to adjust a pH of the ink composition, and since the viscosity of the ink tends to be increased when the alkanolamine is contained, the pinning effect is improved, and as a result, the image quality may be improved in some cases.

As the alkanolamine, for example, there may be mentioned monoethanolamine, diethanolamine, triethanolamine, N,N-dimethylethanolamine, N,N-diethylethanolamine, N,N-dibutylethanolamine, N-aminoethylethanolamine, N-methylethanolamine, N-ethylethanolamine, N-butylethanolamine, N-tert-butylethanolamine, N-methyldiethanolamine, N-ethyldiethanolamine, N-butyldiethanolamine, N-tert-butyldiethanolamine, 2-amino-1-propanol, 2-amino-2-methyl-1-propanol, 5-amino-1-pentanol, 2-amino-2-methyl-1,3-propanediol, 2-amino-2-hydroxymethyl-1,3-propanediol, 3-amino-1,2-propanediol, 3-methylamino-1,2-propanediol, propanolamine, N,N-dimethylpropanolamine, N,N-diethylpropanolamine, tripropanolamine, isopropanolamine, diisopropanolamine, triisopropanolamine, N,N-dimethylisopropanolamine, or N,N-diethylisopropanolamine. In addition, an alkanolamine in the form of a liquid at ordinary temperature is included in the organic solvent described above.

The content of the alkanolamine in the light ink composition with respect to the total mass of the light ink composition is preferably 5.0 percent by mass or less, more preferably 4.0 percent by mass or less, and further preferably 3.0 percent by mass or less. In addition, the content of the alkanolamine in the light ink composition with respect to the total mass of the light ink composition is preferably 0.10 percent by mass or more, more preferably 0.50 percent by mass or more, even more preferably 1.0 percent by mass or more, and further preferably 1.5 percent by mass or more.

The content of the alkanolamine in the deep ink composition with respect to the total mass of the deep ink composition is preferably 4.0 percent by mass or less, more preferably 3.0 percent by mass or less, and further preferably 2.0 percent by mass or less. In addition, the content of the alkanolamine in the deep ink composition with respect to the total mass of the deep ink composition is preferably 0.05 percent by mass or more, more preferably 0.25 percent by mass or more, even more preferably 0.50 percent by mass or more, and further preferably 1.0 percent by mass or more.

The content of the alkanolamine in the light ink composition is preferably higher than the content of the alkanolamine in the deep ink composition and is higher preferably by 0.5 percent by mass or more, more preferably by 0.8 to 5 percent by mass, and further preferably by 1 to 3 percent by mass.

1.1.5. Resin Dispersion

The light ink composition and the deep ink composition included in the ink set according to this embodiment each may contain a resin dispersion formed from one of an acrylic-based resin, a polyurethane-based resin, a polyester-based resin, and a polyolefin-based resin.

When the ink composition contains the resin dispersion described above, the abrasion resistance preferably tends to be further improved.

As a resin of the resin dispersion, for example, there may be mentioned an acrylic-based resin, a polyurethane-based resin, a fluorene-based resin, a rosin modified resin, a terpene-based resin, a polyester-based resin, a polyolefin-based resin, a polyamide-based resin, an epoxy-based resin, a vinyl chloride-based resin, or an ethylene-vinyl acetate-based resin, and among those mentioned above, one of an acrylic-based resin, a polyurethane-based resin, a polyester-based resin, and a polyolefin-based resin is preferable. Although being frequently used in the form of an emulsion, the resin in the resin dispersion may also be used in the form of a powder.

The acrylic-based resin is a generic name of a polymer obtained by polymerization using at least one acrylic-based monomer, such as (meth)acrylic acid or a (meth)acrylate ester, as one component, and for example, a resin obtained from an acrylic-based monomer or a copolymer of an acrylic-based monomer and a monomer different therefrom may be mentioned. For example, an acrylic-vinyl-based resin which is a copolymer between an acrylic-based monomer and a vinyl-based monomer may be mentioned. Furthermore, for example, a copolymer with a vinyl-based monomer such as styrene may also be mentioned. As the acrylic-based monomer, for example, acrylamide or acrylonitrile may also be used.

As the resin emulsion using an acrylic-based resin as a raw material, there may also be used a commercially available product selected, for example, from FK-854, Movinyl 952B, and 718A (trade name, manufactured by Japan Coating Resin Corporation); Nipol LX852 and LX874 (trade name, manufactured by Zeon Corporation); Polysol AT860 (trade name, manufactured by Showa Denko K.K.); and Boncoat AN-1190S, YG-651, AC-501, AN-1170, and 4001 (trade name, acrylic-based resin emulsion, manufactured by DIC Corporation).

In addition, in this specification, the acrylic-based resin may be a styrene-acrylic-based resin as described above. In addition, in this specification, "(meth)acryl" indicates at least one of acryl and methacryl.

The styrene-acrylic-based resin is a copolymer obtained from a styrene monomer and an acrylic-based monomer, and for example, a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer may be mentioned. As the styrene-acrylic-based resin, a commercially available product may also be used, and for example, Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); or Movinyl 966A or 975N (trade name, manufactured by Japan Coating Resin Corporation) may be mentioned.

The polyurethane-based resin is a generic name of a resin having an urethane bond. As the polyurethane-based resin, a polyether type urethane resin having an ether bond in its main chain besides an urethane bond, a polyester type urethane resin having an ester bond in its main chain besides an urethane bond, or a polycarbonate type urethane resin having a carbonate bond in its main chain besides an urethane bond may also be used. As the polyurethane-based resin, a commercially available product may also be used, and for example, at least one selected from commercially available products, such as Superflex 210, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6020, WS-6021, and W-512-A-6 (trade name, manufactured by Mitsui Chemicals Polyurethane Inc.); Suncure 2710 (trade name, manufactured by Lubrizol); and Permarin UA-150 (trade name, manufactured by Sanyo Chemical Industries, Ltd.) may be used.

Although the polyester-based resin is not particularly limited, for example, a poly(ethylene terephthalate) may be mentioned. As the polyester-based resin, a commercially available product may also be used, and for example, Elitel KT8701 (trade name, manufactured by Unitika Ltd.) may be mentioned.

As the polyolefin-based resin, for example, a resin manufactured from an olefin, such as ethylene, propylene, or butylene, or its derivative may be mentioned, and in particular, for example, a polyethylene-based resin, a polypropylene-based resin, or a polybutylene-based resin may be mentioned.

As a commercially available product of the polyolefin-based resin, for example, there may be mentioned AQUACER Series, such as AQUACER 513 (polyethylene-based resin, average particle diameter: 100 to 200 nm, melting point: 130° C., solid content: 30%), AQUACER 507, AQUACER 515, AQUACER 840, or AQUACER 1547 (trade name, manufactured by BYK Japan KK); Hitech Series, such as Hitech E-7025P, Hitech E-2213, Hitech E-6500, Hitech E-6314, Hitech E-9460, Hitech E-9015, Hitech E-4A, Hitech E-5403P, or Hitech E-8237 (trade name, polyethylene-based resin, manufactured by Toho Chemical Industry Co., Ltd.); or Nopcoat PEM-17 (trade name, polyethylene emulsion, average particle diameter: 40 nm, manufactured by San Nopco Limited).

In addition, the resin of the resin dispersion may be supplied in the form of an emulsion, and as an example of a commercially available product of the resin emulsion as described above, for example, there may be mentioned Microgel E-1002 or E-5002 (trade name, styrene-acrylic-based resin emulsion, manufactured by Nippon Paint Co., Ltd.); Boncoat AN-1190S, YG-651, AC-501, AN-1170, 4001, or 5454 (trade name, styrene-acrylic-based resin emulsion, manufactured by DIC Corporation); Polysol AM-710, AM-920, AM-2300, AP-4735, AT-860, or PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, or AD-70 (ethylene/vinyl acetate resin emulsion), or Polysol PSASE-6010 (ethylene/vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy modified styrene-acrylic resin emulsion, manufactured by Emulsion Technology Co., Ltd.); Seikadyne 1900W (trade name, ethylene/vinyl acetate resin emulsion, manufactured by Dainichiseika Color & Chemicals Mfg. Co., Ltd.); Vinyblan 2682 (acrylic resin emulsion), Vinyblan 2886 (vinyl acetate/ acrylic resin emulsion), or Vinyblan 5202 (acrylic acetate resin emulsion) (trade name, manufactured by Nisshin Chemical Industry Co., Ltd.); Vinyblan 700 or 2586 (trade name, manufactured by Nisshin Chemical Industry Co., Ltd.); Elitel KA-5071S, KT-8803, KT-9204, KT-8701, KT-8904, or KT-0507 (trade name, polyester-resin emulsion, manufactured by Unitika Ltd.); Hitech SN-2002 (trade name, polyester resin emulsion, manufactured by Toho Chemical Industry Co., Ltd.); Takelac W-6020, W-635, W-6061, W-605, W-635, or W-6021 (trade name, urethane-based resin emulsion, manufactured by Mitsui Chemicals Polyurethane Inc.); Superflex 870, 800, 150, 420, 460, 470, 610, 620, or 700 (trade name, urethane-based resin emulsion, manufactured by DKS Co., Ltd.); Permarin UA-150 (trade name, urethane-based resin emulsion, manufactured by Sanyo Chemical Industries, Ltd.); Suncure 2710 (trade name, urethane-based resin emulsion, manufactured by Lubrizol); NeoRez R-9660, R-9637, or R-940 (trade name, urethane-based resin emulsion, manufactured by Kusumoto Chemicals, Ltd.); Adeka Bontighter HUX-380 or 290K (trade name, urethane-based resin emulsion, manufactured by ADEKA Corporation); Movinyl 966A or Movinyl 7320 (trade name, manufactured by Japan Coating Resin Corporation); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); NK Binder R-5HN (trade name, manufactured by shin-Nakamura Chemical Co., Ltd.); or Hydran WLS-210 (trade name, non-crosslinked polyurethane, manufactured by DIC Corporation).

The resin of the resin dispersion may be used alone, or at least two types thereof may be used in combination.

Since the resin of the resin dispersion is likely to be formed into a film on a recording medium and has a more excellent abrasion resistance because of an excellent adhe- sion, a glass transition temperature (Tg) of the resin of the resin dispersion is preferably 150° C. or less and more preferably 120° C. or less. On the other hand, since the abrasion resistance is more excellent due to the hardness of the resin, and since a blocking/offset resistance is more excellent, the glass transition temperature described above is preferably −50° C. or more, more preferably 0° C. or more, and further preferably 20° C. or more. In addition, the glass transition temperature (Tg) may be confirmed by a known method using a differential scanning calorimetry (DSC) or the like.

When the resin dispersion is contained, a content of the resin dispersion on a solid content basis with respect to the total mass of the ink composition is 0.1 to 20 percent by mass, preferably 1.0 to 15.0 percent by mass, more preferably 2.0 to 10.0 percent by mass, and further preferably 3.0 to 8.0 percent by mass.

1.1.6. Surfactant

The light ink composition and the deep ink composition included in the ink set according to this embodiment each may contain a surfactant. The surfactant has a function to decrease a surface tension of the ink composition and to improve a wettability thereof to a recording medium or an underlayer. Among the surfactants, an acetylene glycol-based surfactant, a silicone-based surfactant, or a fluorine-based surfactant may be preferably used.

Although the acetylene glycol-based surfactant is not particularly limited, for example, there may be mentioned Surfyol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, E00P, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether modified organosiloxane may be mentioned. As a commercially available product of the polyether modified organosiloxane, for example, there may be mentioned BYK-306, BYK-307, BYK-333, BYK-341, BYK-345, BYK-346, BYK-348, BYK-349, BYK-3420, BYK-3480, or BYK-3481 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, for example, a fluorine modified polymer is preferably used, and as a concrete example, BYK-3440 (trade name, manufactured by BYK Japan KK); Surflon 5-241, S-242, or S-243 (trade name, manufactured by AGC Seimi Chemical Co., Ltd.); or Ftergent 215M (trade name, manufactured by Neos Co., Ltd.) may be mentioned.

When the surfactant is contained in the ink composition, at least two types of surfactants may be contained therein. A content of the surfactant contained in the ink composition with respect to the total mass of the ink composition is preferably 0.1 to 2.0 percent by mass, more preferably 0.2 to 1.5 percent by mass, and further preferably 0.3 to 1.0 percent by mass.

1.1.7. Other Components

As components other than those described above contained in the light ink composition and the deep ink composition included in the ink set according to this embodiment, various additives, such as a defoaming agent, a solubilizing agent, a viscosity adjuster, a pH adjuster, an antioxidant, an antiseptic agent, an antifungal agent, a corrosion inhibitor, a moisturizing agent other than the organic solvent, and/or a chelating agent to trap metal ions having influence on dispersion may be appropriately added.

1.1.8. Preparation Method of Ink Composition

The light ink composition and the deep ink composition included in the ink set according to this embodiment may be obtained such that the components described above are mixed together in an arbitrary order, and if needed, impurities are removed by filtration or the like. As a mixing method of the components, a method in which after being sequentially added in a container equipped with a stirring device, such as a mechanical stirrer or a magnetic stirrer, the materials are stirred and mixed is preferably used. As a filtration method, for example, if needed, a centrifugal filtration or a filter filtration may be performed.

1.1.9. Physical Properties of Ink Composition

In view of the balance between the image quality and the reliability as the ink for ink jet recording, the light ink composition and the deep ink composition included in the ink set according to this embodiment each have a surface tension at 20° C. of preferably 18 to 40 mN/m, more preferably 20 to 35 mN/m, and further preferably 22 to 33 mN/m. The surface tension may be measured using, for example, an automatic surface tensiometer CBVP-Z (trade name, manufactured by Kyowa Interface Science Co., Ltd.) such that a surface tension is confirmed when a platinum plate is wet with an ink in an environment at 20° C.

In addition, from the same point as described above, the viscosities of the ink compositions according to this embodiment at 20° C. are each preferably 3 to 10 mPa-s and more preferably 3 to 8 mPa-s. In addition, the viscosity may be measured in an environment at 20° C. using, for example, a viscoelastic tester MCR-300 (trade name, manufactured by Pysica).

1.2. Treatment Liquid

The treatment liquid included in the ink set according to this embodiment contains an aggregating agent.

In addition, in this embodiment, the treatment liquid is an auxiliary liquid to be adhered to a recording medium before or after the deep ink composition and the light ink composition described above are adhered thereto. Although the treatment liquid may not contain the colorant described above, a content of the colorant is preferably 0.2 percent by mass or less, more preferably 0.1 percent by mass or less, and further preferably 0.05 percent by mass or less. The colorant is more preferably not contained.

The treatment liquid is preferably a "water-based" composition.

1.2.1. Aggregating Agent

The treatment liquid included in the ink set according to this embodiment contains an aggregating agent. Since the treatment liquid contains an aggregating agent, in an ink adhesion step which will be described later, the aggregating agent rapidly reacts with the colorant or the like contained in the ink composition. Accordingly, the dispersion state of the colorant or the like in the ink composition is destroyed, the colorant is aggregated, and this aggregate thus formed disturbs permeation of the colorant into a recording medium; hence, the image quality of a recorded image is believed to be improved.

As the aggregating agent, for example, a polyvalent metal salt, an organic acid, or a cationic compound (such as a cationic resin or a cationic surfactant) may be mentioned. Those aggregating agents may be used alone, or at least two types thereof may be used in combination. Among the aggregating agents, since being excellent in reactivity with the colorant or the like contained in the ink composition, at least one selected from the group consisting of a polyvalent metal salt and a cationic resin is preferably used.

As the polyvalent metal salt, a water-soluble compound formed from at least divalent metal ions and negative ions bonded thereto may be mentioned. As a concrete example of the polyvalent metal ion, for example, there may be mentioned a divalent metal ion, such as $Ca^{2+}$, $Cu^{2+}$, $Ni^{2+}$, $Mg^{2+}$, $Zn^{2+}$, or $Ba^{2+}$; or a trivalent metal ion, such as $Al^{3+}$, $Fe^{3+}$, or $Cr^{3+}$. As the negative ion, for example, there may be mentioned $Cl^-$, $I^-$, $Br^-$, $SO_4^{2-}$, $ClO^{3-}$, or $NO^{3-}$, or $HCOO^-$ or $CH_3COO^-$. Among those polyvalent metal salts mentioned above, in view of the stability of the treatment liquid and the reactivity as the aggregating agent, a calcium salt and a magnesium salt are preferable.

As the organic acid, for example, there may be preferably mentioned phosphoric acid, a polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, or a derivative or a salt thereof. The organic acids may be used alone, or at least two types thereof may be used in combination.

As the cationic resin, for example, there may be mentioned a cationic urethane resin, a cationic olefin resin, a cationic allylamine resin, a polyamine resin, or a quaternary ammonium salt polymer.

As the cationic urethane resin, a known resin may be appropriately selected and used. As the cationic urethane resin, a commercially available product may be used, and for example, Hydran CP-7010, CP-7020, CP-7030, CP-7040, CP-7050, CP-7060, or CP-7610 (trade name, manufactured by DIC Corporation); or Superflex 600, 610, 620, 630, 640, or 650 (trade name, manufactured by DKS Co., Ltd.); or Urethane Emulsion WBR-2120C or WBR-2122C (trade name, manufactured by Taisei Fine Chemical Co., Ltd.) may be mentioned.

The cationic olefin resin is a resin having a structural skeleton of an olefin, such as ethylene or propylene, and a known resin may be appropriately selected and used. In addition, the cationic olefin resin may be in an emulsion state in which the resin is dispersed in a solvent, such as water and/or an organic solvent. As the cationic olefin resin, a commercially available product may be used, and for example, Arrowbase CB-1200 or CD-1200 (trade name, manufactured by Unitika Ltd.) may be mentioned.

As the cationic allylamine resin, a known resin may be appropriately selected and used, and for example, there may be mentioned a polyallylamine hydrochloride, a polyallylamineamide sulfate, an allylamine hydrochloride/diallylamine hydrochloride copolymer, an allylamine acetate/diallylamine acetate copolymer, an allylamine hydrochloride/dimethylallylamine hydrochloride copolymer, an allylamine/dimethylallylamine copolymer, a polydiallylamine hydrochloride, a polymethyldiallylamine hydrochloride, a polymethyldiallylamineamide sulfate, a polymethyldiallylamine acetate, a polydiallyldimethylammonium chloride, a diallylamine acetate/sulfur dioxide copolymer, a diallyl methyl ethyl ammonium ethyl sulfate/sulfur dioxide copolymer, a methyldiallylamine hydrochloride/sulfur dioxide copolymer, a diallyldimethylammonium chloride/sulfur dioxide copolymer, or a diallydimethylammonium chloride/acrylamide copolymer.

As the cationic allylamine resin described above, a commercially available product may be used, and for example, there may be mentioned PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-M-1, PAS-22SA, PAS-M-1A, PAS-92, or PAS-92A (trade name, manufactured by Nittobo Medical Co., Ltd.); or Hymo Neo-600, Hymoloc Q-101, Q-311, or Q-501, or Hymax SC-505 or SC-505 (trade name, manufactured by Hymo Corporation).

As the quaternary ammonium salt polymer, for example, there may be mentioned an amine/epichlorohydrin copolymer, a poly(2-hydroxy-3-methacryloxypropyltrimethylammonium chloride), a poly(2-hydroxy-3-methacryloxypropyltriethylammonium chloride), a poly(2-hydroxy-3-acryloxypropyltrimethylammonium chloride), a poly(2-hydroxy-3-acryloxypropyltriethylammonium chloride), a poly(2-methacryloxyethyltrimethylammonium chloride), a poly(2-methacryloxyethyltriethylammonium chloride), a poly(2-acryloxyethyltrimethylammonium chloride), a poly(2-acryloxyethyltriethylammonium chloride), a poly (dimethylaminoethyl methacrylate) salt, a poly(diethylaminoethyl methacrylate) salt, a poly(diethylaminoethyl acrylate) salt, a poly(dimethylaminoethyl acrylate) salt, a poly(4-vinyl-N-methylpyridinium chloride), N,N-dimethyl substituted 3,5-methylpiperidinium chloride resin, a poly (dimethyldiallylammonium chloride), a poly(diethyldiallylammonium chloride, or a polyethyleneimine hydrochloride.

As the quaternary ammonium salt polymer, a commercially available product may also be used, and for example, there may be mentioned Catiomaster PD-7 (amine/epichlorohydrin copolymer, manufactured by Yokkaichi Chemical Company Limited); PAS-H-1L, PAS-H-5L, PAS-H-10L, PAS-24, PAS-2401, PAS-A-1, PAS-A-5, PAS-J-81L, PAS-J-81, or PAS-J-41 (manufactured by Nittobo Medical Co., Ltd.); or Papiogen P-105 or Milliogen P-20 (manufactured by Senka Corporation).

As the cationic surfactant, for example, there may be mentioned a primary amine type, a secondary amine type, or a tertiary amine type compound, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, or an imidazolinium salt. As a concrete example of the cationic surfactant, for example, there may be mentioned a hydrochloride, an acetate, or the like of lauryl amine, palm amine, a rosin amine, or the like; lauryl trimethyl ammonium chloride, cetyl trimethyl ammonium chloride, benzyl tributyl ammonium chloride, benzalkonium chloride, dimethyl ethyl lauryl ammonium ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, or octadecyl dimethyl ammonium chloride.

The aggregating agents may be used alone, or at least two types thereof may be used in combination.

A content of the aggregating agent with respect to a total mass (100 percent by mass) of the treatment liquid is preferably 0.1 to 25 percent by mass, more preferably 1 to 20 percent by mass, and further preferably 3 to 10 percent by mass.

1.2.2. Water

The treatment liquid included in the ink set according to this embodiment may also contain water. As the water, water similar to that described by way of example in the above ink composition may be used. A content of the water contained in the treatment liquid with respect to the total mass of the treatment liquid may be set to, for example, 40 percent by mass or more and is preferably 50 percent by mass or more, more preferably 60 percent by mass or more, and further preferably 70 percent by mass or more.

1.2.3. Organic Solvent

The treatment liquid included in the ink set according to this embodiment may contain an organic solvent. As the organic solvent, an organic solvent similar to that described by way of example in the above ink composition may be used. A content of the organic solvent is not particularly limited, and for example, with respect to the total mass of the treatment liquid, the content described above may be set to 10 to 80 percent by mass and is preferably 15 to 70 percent by mass.

A standard boiling point of the organic solvent may be set in a preferable temperature range of the standard boiling point of the organic solvent which may be contained in the ink composition described above independently of the standard boiling point of the organic solvent described above. Alternatively, the standard boiling point of the organic solvent is preferably 180° C. or more, more preferably 190° C. or more, and further preferably 200° C. or more. In addition, the standard boiling point of the organic solvent is preferably 300° C. or less, more preferably 270° C. or less, and further preferably 250° C. or less.

1.2.4. Alkanolamine

The treatment liquid included in the ink set according to this embodiment may contain an alkanolamine. As the alkanolamine, an alkanolamine similar to that described by way of example in the ink composition may be used. A content of the alkanolamine with respect to the total mass of the treatment liquid is, for example, preferably 0.01 to 5 percent by mass, more preferably 0.03 to 3 percent by mass, even more preferably 0.05 to 1 percent by mass, and further preferably 0.07 to 0.5 percent by mass.

1.2.5. Surfactant

The treatment liquid included in the ink set according to this embodiment may contain a surfactant. As the surfactant, a surfactant similar to that described by way of example in the ink composition may be used. A content of the surfactant in the treatment liquid may be set as is the case of that described in the above ink composition.

1.2.6. Other Components

The treatment liquid included in the ink set according to this embodiment may contain other components which can be contained in the ink composition described above, and for example, there may be mentioned a resin dispersion, a defoaming agent, a solubilizing agent, a viscosity adjuster, a pH adjuster, an antioxidant, an antiseptic agent, a fungicide, a corrosion inhibitor, a moisturizing agent other than an organic solvent, and/or a chelating agent to trap metal ions influencing the dispersion. Those components and the contents thereof may be set similar to those of the ink composition described above.

1.2.7. Preparation Method and Physical Properties of Treatment Liquid

Since a preparation method and physical properties of the treatment liquid included in the ink set according to this embodiment are similar to those describe in the ink composition described above, the description thereof will be omitted.

1.3. Application of Ink Set

The ink set according to this embodiment is preferably used for recording on a low-absorbing recording medium or a non-absorbing recording medium.

In the recording using the ink set according to this embodiment, a recording medium to form an image is not particularly limited. Hence, as the recording medium, for example, an absorbing recording medium, such as paper, a film, or a cloth, a low-absorbing recording medium, such as printing paper, or a non-absorbing recording medium, such as a metal, a glass, or a high molecular weight material, may be mentioned.

However, the ink set according to this embodiment is preferably used for the recording on a low-absorbing recording medium or a non-absorbing recording medium since an effect of the present disclosure can be more significantly obtained. That is, since the ink is not easily dried on a low-absorbing recording medium or a non-absorbing recording medium as compared to the case on an absorbing recording medium, ink droplets easily gather together, and bleeding is easily generated thereby, so that the image quality is liable to be degraded, and the abrasion resistance is also liable to be degraded. However, according to the ink set of this embodiment, even when the recording is performed on the recording medium as described above, the abrasion resistance is preferable, and an excellent image quality and the prevention of the landing deviation can be obtained at the same time.

The low-absorbing recording medium or the non-absorbing recording medium indicates a recording medium hardly absorbing a liquid, such as an ink composition, or a recording medium absorbing no liquid, respectively. From a quantitative point of view, the low-absorbing recording medium or the non-absorbing recording medium indicates a recording medium having a water absorbing amount of 10 mL/m$^2$ or less from a contact start to a point of 30 msec$^{1/2}$ by Bristow method. This Bristow method is a most popular measurement method of a liquid absorption amount in a short time and has also been employed by Japan Technical Association of the Pulp and Paper Industry (JAPAN TAPPI).

The details of the test method have been disclosed in Standard No. 51 "Paper and Paperboard-Liquid Absorption Test Method-Bristow Method", JAPAN TAPPI PAPER AND PULP TEST METHODS, 2000. On the other hand, the absorbing recording medium indicates a recording medium having neither a non-absorbing property nor a low-absorbing property.

As the non-absorbing recording medium, a recording medium having a recording surface formed of a plastic may be mentioned. In addition, the recording surface includes neither an absorbing layer nor a receiving layer to absorb a liquid. For example, there may be mentioned a recording medium in which a plastic is coated on a substrate such as paper, a recording medium in which a plastic film is adhered to a substrate such as paper, or a plastic film having neither an absorbing layer nor a receiving layer. The plastic described above indicates, for example, a poly(vinyl chloride), a poly(ethylene terephthalate), a polycarbonate, a polystyrene, a polyurethane, a polyethylene, or a polypropylene.

As the low-absorbing recording medium, a recording medium, so-called coated paper, having a coated layer as a surface layer may be mentioned. For example, as a recording medium using paper as a substrate, printing paper, such as art paper, coated paper, or matte paper, may be mentioned. When the substrate is a plastic film, there may be mentioned a recording medium in which a hydrophilic polymer or the like is coated on a surface of a poly(vinyl chloride), a poly(ethylene terephthalate), a polycarbonate, a polystyrene, a polyurethane, a polyethylene, a polypropylene, or the like or a recording medium in which particles of silica, titanium, or the like are coated with a binder on the surface mentioned above.

The ink set according to this embodiment may also be preferably used for recording on a flexible package film. The flexible package film is one type of the non-absorbing recording medium described above. In more particular, the flexible package film is a highly flexible film material which is used, for example, for food package and package of toiletry and cosmetics, which has an anti-fog property and an antistatic property, which contains an antioxidant or the like in its film surface, and which has a thickness of 5 to 70 μm and preferably 10 to 50 μm. When being adhered to the film described above, an ink composition is more unlikely to be fixed thereto and is liable to cause bleeding as compared to the case in which a plastic film having an ordinary thickness is used, and as a result, the image quality may be degraded in some cases. However, the ink set according to this embodiment also tends to obtain an excellent image quality even on the flexible package film.

As a material forming a recording surface of the flexible package film, a material containing at least one selected from an olefin-based resin, such as a polyethylene or a polypropylene, an ester-based resin such as a polyester, a vinyl chloride-based resin such as a poly(vinyl chloride), and an amide-based resin such as a polyamide may be used. As a film substrate including the recording surface of the flexible package film, those resins mentioned above each may be used after being processed into a film shape or a sheet shape. In the case of a film or a sheet formed from the resin, a non-stretched film or a stretched film stretched in one axial direction or biaxial directions may be used, and a film stretched in biaxial directions is preferably used. In addition, if needed, films or sheets formed from those various types of resins mentioned above may be used in a laminated state after being adhered to each other.

In addition, the ink set according to this embodiment may also be preferably used for recording on a sign graphic recording medium. As the sign graphic recording medium, for example, many various types of materials, such as a banner, coated paper, matte paper, wallpaper, a cloth, and a plastic film, such as a PET or a PVC film, have been widely used, and in particular, the ink set according to this embodiment may be preferably used on a transparent or a semi-transparent plastic film to be used for a window display, a car wrapping, or the like. Those films described above each have a substrate formed from a polyolefin, a PET, a PVC, or the like having flexibility and are frequently used after an adhesive layer is provided on a surface of the substrate opposite to a recording surface thereof, and after the printing is performed, the films are each adhered to a window glass, a car body, or the like with an adhesive surface. When being adhered to this film, an ink is more unlikely to be fixed thereto and is liable to cause bleeding, and as a result, the image quality may be degraded in some cases. However, the ink set according to this embodiment also tends to obtain an excellent image quality even on a sign graphic film.

As a material forming a recording surface of the sign graphic film, for example, a material containing at least one selected from an olefin-based resin, such as a polyethylene or a polypropylene, an ester-based resin such as a polyester, a vinyl chloride-based resin such as a poly(vinyl chloride), and an amide-based resin such as a polyamide, may be used.

In addition, for example, the recording medium may be colorless and transparent, semi-transparent, colored transparent, colored opaque, or colorless and opaque.

2. Recording Method

A recording method using the ink set described above, according to one embodiment of the present disclosure includes: a step of adhering the treatment liquid described above to a recording medium; and a step of adhering the light ink composition and the deep ink composition to the recording medium by an ink jet method.

According to the recording method of this embodiment, an excellent image quality is obtained, and in addition, the landing deviation can be significantly reduced.

In general, since the content of a colorant which is an aggregating component of a light ink is lower than that of a deep ink, a reactivity of the light ink with a treatment liquid is lower than that of the deep ink, and hence, an image quality obtained by a recording method using the light ink is liable to be insufficient. In addition, even when the image quality of the light ink can be improved, the ejection characteristics of the light ink are difficult to coincide with those of the deep ink, and the landing deviation is disadvantageously generated when those two types of inks are ejected at the same time.

According to this embodiment, in the light ink composition included in the ink set used for the recording method, since the organic solvent (specific condensate) which is a condensate of an alkanediol having 2 or 3 carbon atoms and which has two hydroxy groups is contained, an excellent image quality is obtained. The reason for this is that since the specific condensate having a relatively high viscosity is contained, when drying of the light ink composition adhered to a recording medium is advanced, the viscosity of the ink is significantly increased, and as a result, movement of ink droplets is further suppressed. That is, by a fixing effect (pinning effect) of the ink droplets on the recording medium by a reaction with the treatment liquid and a pinning effect by the increase in viscosity of the ink droplets themselves, the ink droplets can be fixed before gathering together and bleeding, and hence, an excellent image quality is obtained.

Furthermore, in the deep ink composition included in the ink set used for the recording method, since the organic solvent (specific monomer) which is an alkanediol having 2 to 4 carbon atoms is contained, the ejection characteristics of the deep ink composition can be made to coincide with those of the light ink composition, and the landing deviation can be preferably reduced. The reason for this is believed that since the specific condensate contained in the light ink composition and the specific monomer contained in the deep ink composition are compounds similar to each other, the ejection characteristics (in particular, the viscosities) thereof are also similar to each other. In addition, although the viscosity of the ink tends to be decreased when the content of the colorant contained therein is low, when the specific condensate is contained in the light ink composition, the viscosity thereof is appropriately adjusted, and hence the ejection characteristics thereof are believed to be easily made to coincide with each other.

Hereinafter, the steps of the recording method according to this embodiment and an ink jet recording apparatus to be applied to the recording method described above will be described.

2.1. Treatment Liquid Adhesion Step

The recording method according to this embodiment includes a step (treatment liquid adhesion step) of adhering the treatment liquid included in the ink set described above to a recording medium.

Although a method to adhere the treatment liquid to a recording medium is not particularly limited, for example, a method to apply the treatment liquid by a roll coater or the like, a method to spray the treatment liquid by a spray or the like, or a method to apply the treatment liquid by an ink jet method may be mentioned. Among those methods described above, the treatment liquid is preferably adhered to a recording medium by an ink jet method. Accordingly, since the treatment liquid can be selectively adhered only to a required portion, the ink jet method is preferable since being excellent in terms of reduction in liquid amount use, that is, reduction in printing cost, decrease in drying time, and the like. In addition, when the treatment liquid is applied by an ink jet method, for example, using an ink jet recording apparatus 1 as shown in FIG. 1, ejection can be performed by an ink jet head 2.

As the recording medium, a recording medium similar to the recording medium to be used for the ink set described above by way of example may be used, and a low-absorbing recording medium or a non-absorbing recording medium is more preferable.

The treatment liquid adhesion step may be performed before or after the adhesion of the ink composition and may also be performed at the same time when the ink composition is adhered. When the treatment liquid is adhered before the ink composition adhesion or at the same time as the ink composition adhesion, the recording medium is preferably heated by a pre-heater 7 as shown in FIG. 1 before the treatment liquid adhesion step or by an IR heater 3 or a platen heater 4 as shown in FIG. 1 in the treatment liquid adhesion step. When the treatment liquid is adhered to a heated recording medium, the treatment liquid ejected on the recording medium is likely to wet-spread on the recording medium and may be uniformly applied thereto in some cases. Accordingly, the ink composition adhered in the ink adhesion step which will be described later and the treatment liquid sufficiently react with each other, and an excellent image quality tends to be obtained. In addition, since the treatment liquid is uniformly applied on a recording medium M, the amount of the treatment liquid can be decreased, and the abrasion resistance of an image thus obtained may be prevented from being degraded in some cases.

An adhesion amount of the treatment liquid per unit area of a recording region of the recording medium is preferably 0.1 to 5 mg/inch$^2$, more preferably 0.3 to 4 mg/inch$^2$, even more preferably 0.5 to 3 mg/inch$^2$, and further preferably 0.7 to 2 mg/inch$^2$.

The adhesion amount of the treatment liquid may also be preferably regarded as the maximum adhesion amount per unit area of the recording region of the recording medium.

A surface temperature of the recording medium when the treatment liquid is adhered may be set independently of a temperature in a preferable range of a surface temperature (primary heating temperature) of the recording medium when the ink is adhered which will be described later. For example, when the treatment liquid is adhered, the surface temperature of the recording medium is preferably 45° C. or less, more preferably 40° C. or less, and further preferably 38° C. or less. In addition, a lower limit of the surface temperature of the recording medium when the treatment liquid is adhered is preferably 25° C. or more, more preferably 30° C. or more, and further preferably 32° C. or more. When the treatment liquid is adhered, if the surface temperature of the recording medium is in the range described above, the treatment liquid can be uniformly applied to the recording medium, and the abrasion resistance and the image quality tend to be improved. In addition, when the ink jet recording apparatus 1 as shown in FIG. 1 is used, influence of heat to the ink jet head 2 may be suppressed in some cases.

2.2. Ink Adhesion Step

The recording method according to this embodiment includes a step (ink adhesion step) of adhering the light ink composition and the deep ink composition to the recording medium by an ink jet method.

For example, when the ink jet recording apparatus 1 as shown in FIG. 1 is used, the ink adhesion step is a step of adhering the light ink composition and the deep ink composition included in the ink set described above by ejection thereof from the ink jet head 2, and by this step, an image of the light ink composition and the deep ink composition is formed on the surface of the recording medium.

A recording region of the recording medium in which recording is performed includes a region in which the treatment liquid and the ink composition are both adhered, and the ink composition contains at least one of the light ink composition and the deep ink composition. In addition, in the recording region, a region to which the light ink composition is adhered and a region to which the deep ink composition is adhered may be different from each other. Alternatively, the light ink composition and the deep ink composition may be both adhered to the same region.

In this embodiment, the ink adhesion step may also include a step of adhering the light ink composition included in the ink set described above to the recording medium by an ink jet method and a step of adhering the deep ink composition included in the ink set described above to the recording medium by an ink jet method, and the step of adhering the light ink composition to the recording medium and the step of adhering the deep ink composition to the recording medium may be or may not be performed at the same time.

An adhesion amount of the light ink composition per unit area of the recording region of the recording medium is preferably 0.5 to 20 mg/inch$^2$, more preferably 1 to 15 mg/inch$^2$, even more preferably 2 to 10 mg/inch$^2$, and further preferably 3 to 8 mg/inch$^2$.

An adhesion amount of the deep ink composition per unit area of the recording region of the recording medium is preferably 1 to 40 mg/inch$^2$, more preferably 2 to 30 mg/inch$^2$, even more preferably 4 to 20 mg/inch$^2$, and further preferably 6 to 16 mg/inch$^2$.

The adhesion amount of each ink composition may also be preferably regarded as the maximum adhesion amount per unit area of the recording area of the recording medium.

In addition, an adhesion amount ratio (A/B) of an adhesion amount (A) of the light ink composition and an adhesion amount (B) of the deep ink composition is preferably 0.3 to 0.7.

2.3. Primary Heating Step

The recording method according to this embodiment may also include a primary heating step of heating the light ink composition and the deep ink composition adhered to the recording medium, and a surface temperature of the recording medium in the primary heating step is preferably 45° C.

or less, more preferably 28° C. to 45° C., even more preferably 30° C. to 45° C., further preferably 32° C. to 45° C., and particularly preferably 35° C. to 43° C.

The primary heating step is a step to dry the light ink composition and the deep ink composition adhered to the recording medium by heating at an early stage. The primary heating step is a heating step to dry at least a part of the solvent component of the ink so as to at least decrease the fluidity of the ink.

Since the primary heating step as described above is performed, the pinning effect may be obtained in some cases, and the image quality tends to be improved. However, when a heating temperature in the primary heating step is high, degradation in clogging recovery property and the landing deviation may be disadvantageously liable to occur. On the other hand, according to the recording method of this embodiment, since the ink set including the light ink composition which is likely to obtain the pinning effect is used, even by heating/drying performed at a relatively low temperature such as in the preferable temperature range as described above, the viscosity of the ink is significantly increased, and more excellent image quality and reduction in landing deviation can be obtained at the same time.

The primary heating step may be performed such that the light ink composition and the deep ink composition are adhered to a heated recording medium or may be performed at an early stage after the light ink composition and the deep ink composition are adhered to the recording medium. Heating in the primary heating step is preferably started within 0.5 seconds at the latest after ink droplets of the light ink composition and/or the deep ink composition are landed on the recording medium.

The primary heating step is preferably performed by an IR heater, radiation of microwaves, a platen heater, or a hot wind blown by a fan to the recording medium.

The heating in the primary heating step may be performed before the ink adhesion step described above, at the same time as the ink adhesion, or at an early stage after the ink adhesion and is preferably performed at the same time as the ink adhesion. By the heating order as described above, the ink adhesion step can be performed.

In addition, in the case in which the ink is adhered to a heated recording medium, the heating temperature in the primary heating step is a surface temperature of the recording medium at the ink adhesion, and in the case in which the heating is performed at an early stage after the ink adhesion, the heating temperature in the primary heating step is a surface temperature of the recording medium when the heating is performed. In addition, the heating temperature is the maximum temperature during the heating in the primary heating step.

2.4. Post-Heating Step

The recording method according to this embodiment preferably includes a post-heating step to heat the recording medium to which the light ink composition and the deep ink composition are adhered. By this post-heating step, the drying property is further improved, and a recorded matter having a more excellent abrasion resistance preferably tends to be obtained.

The post-heating step is a heating step to sufficiently perform heating so as to complete the recording and so that the recorded matter can be used. The post-heating step is a heating step to sufficiently dry the solvent component of the ink and to heat the resin contained in the ink so as to flatten a coating film of the ink. The post-heating step is preferably started more than 0.5 seconds after the light ink composition and/or the deep ink composition is adhered to the recording medium. For example, the heating is preferably started to the region described above more then 0.5 seconds after the ink adhesion is all completed to the recording region of the recording medium. In addition, a preferable temperature in the primary heating step described above is preferably different from a preferable temperature in the post-heating step.

For example, when the ink jet recording apparatus is used, the heating of the recording medium in the post-heating step may be performed by an appropriate heating device. In addition, besides the heating device equipped in the ink jet recording apparatus, the heating may be performed by an appropriate heating device.

In addition, a surface temperature of the recording medium in this case is preferably 60° C. or more, more preferably 70° C. or more, even more preferably 80° C. or more, and further preferably 85° C. or more. In addition, a surface temperature of the recording medium heated in the post-heating step is preferably 120° C. or less, more preferably 110° C. or less, even more preferably 100° C. or less, and further preferably 95° C. or less.

2.5. Other Steps

The recording method according to this embodiment may also include a cleaning step to discharge the ink composition and/or the treatment liquid by a device other than a pressure generation device to eject the ink for recording, that is, by a mechanism different from a mechanism to be installed, for example, in the ink jet head 2 shown in FIG. 1 which ejects the ink for the recording.

In addition, as the mechanism to eject the ink for the recording installed in the ink jet head 2, a piezoelectric element provided in a pressure chamber (not shown) to apply a pressure to the ink or a heater element may be mentioned.

This cleaning step may be a step to discharge the ink composition and/or the treatment liquid from a nozzle by applying a pressure from the outside to the ink jet head 2. Even in the case in which welding of a resin or the like to an inner wall of the ink jet head 2 may unfavorably occur, when this cleaning step is performed, the welding described above can be suppressed, and the ejection stability may be further improved in some cases.

In addition, as the different mechanism described above, a mechanism to apply a pressure, such as a mechanism to apply a negative pressure (suction) or a mechanism to apply a positive pressure from upstream of the ink jet head, may be mentioned. The mechanism described above is different from ink discharge (flushing) to be performed by the function of the ink jet head. That is, the discharge described above is not performed by the function to eject the ink from the ink jet head in the recording.

2.6. Ink Jet Recording Apparatus

One example of an ink jet recording apparatus which can be preferably used for the individual steps of the recording method according to this embodiment will be described with reference to the drawings.

Outline of Apparatus Structure

Figure 2:
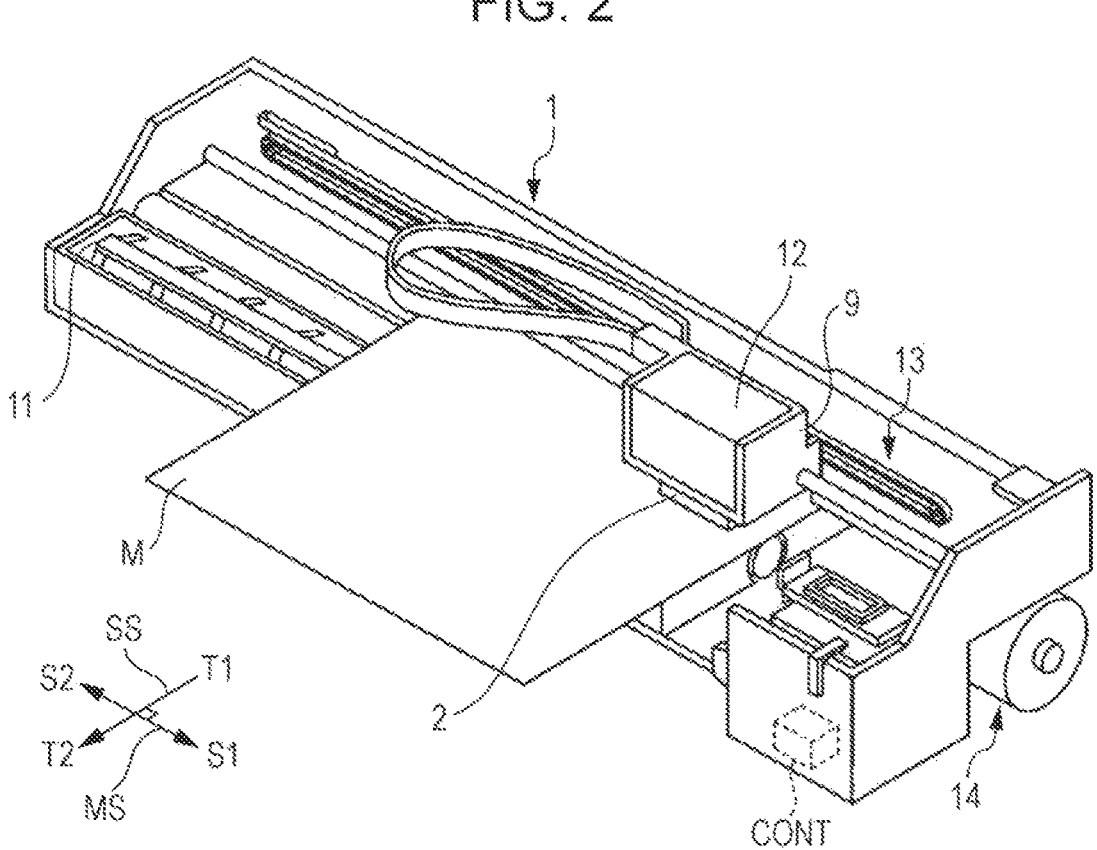
FIG. 2 is a schematic view of a carriage and its vicinity of the example of the ink jet recording apparatus.

FIG. 1 is a cross-sectional view schematically showing an ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes an ink jet head 2, an IR heater 3, a platen heater 4, a heating heater 5, a cooling fan 6, a pre-heater 7, a ventilation fan 8, a carriage 9, a platen 11, a carriage transfer mechanism 13, a transport device 14, and a control portion CONT. In the ink jet recording apparatus 1, all operations thereof are controlled by the control portion CONT shown in FIG. 2.

Structure of Ink Jet Head

The ink jet head 2 has a structure to perform recording on a recording medium M by ejecting an ink composition (hereinafter, referred to as "ink" in some cases) from nozzles of the ink jet head 2 so as to be adhered thereto. The treatment liquid can also be processed in a manner similar to that described above. As shown in FIGS. 1 and 2, the ink jet head 2 is a serial type ink jet head and adheres the ink and/or the treatment liquid to the recording medium M by a plurality of scannings in a main scanning direction relative to the recording medium M. The ink jet head 2 is mounted on the carriage 9 shown in FIG. 2. The ink jet head 2 is scanned a plurality of times in the main scanning direction relative to the recording medium M by the operation of the carriage transfer mechanism 13 to transfer the carriage 9 in a medium width direction of the recording medium M. The medium width direction is the main scanning direction of the ink jet head 2. The scanning in the main scanning direction is also called a main scanning.

In addition, the main scanning direction is a direction in which the carriage 9 mounting the ink jet head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the ink jet head 2 and the sub-scanning which is the transport of the recording medium M are repeatedly performed at least two times, the recording is performed on the recording medium M.

The cartridge 12 to supply the ink and/or the treatment liquid to the ink jet head 2 includes a plurality of independent cartridges. The cartridge 12 is detachably fitted to the carriage 9 mounting the ink jet head 2. In the cartridges, different types of ink compositions and/or the treatment liquid may be filled, and the ink compositions and/or the treatment liquid are supplied to respective nozzles from the cartridge 12. In addition, in FIGS. 1 and 2, although the case in which the cartridge 12 is fitted to the carriage 9 is shown by way of example, the cartridge 12 is not limited thereto and may be provided at a position other than the carriage 9 so that the ink compositions are supplied to the respective nozzles by supply tubes not shown.

For the ejection from the ink jet head 2, a known method may be used. In this embodiment, a method to eject a liquid droplet using vibration of a piezoelectric element, that is, an ejection method to form an ink droplet by a mechanical deformation of a piezoelectric element, is used.

Primary Heating Mechanism

The ink jet recording apparatus 1 may include a primary heating mechanism to heat the recording medium M when the ink is ejected from the ink jet head 2 and is adhered to the recording medium. As the primary heating mechanism, for example, a conduction method, a ventilation method, or a radiation method may be used. The conduction method conducts heat to a recording medium from a member in contact therewith. For example, a platen heater may be mentioned. The ventilation method dries an ink by sending an ordinary temperature wind or a hot wind to a recording medium. For example, a ventilation fan may be mentioned.

The radiation method heats a recording medium by emitting radiation rays generating heat thereto. For example, an IR radiation may be mentioned. In addition, although not shown in the drawing, a heater similar to the platen heater 4 may also be provided right downstream thereof in a SS direction. Those primary heating mechanisms mentioned above may be used alone, or at least two methods thereof may be used in combination. For example, as the primary heating mechanism, the IR heater 3 and the platen heater 4 may be provided.

In addition, when the IR heater 3 is used, by radiation of infrared rays from a ink jet head 2 side, the recording medium M can be heated by a radiation method. Accordingly, although the ink jet head 2 is also liable to be simultaneously heated, compared to the case in which heating is performed from a rear surface of the recording medium M by the platen heater 4 or the like, the temperature can be increased without receiving the influence of the thickness of the recording medium M. In addition, various types of fans (such as the ventilation fan 8) may also be provided to dry the ink on the recording medium M by supplying a hot wind or a wind having the same temperature as that in the environment to the recording medium M.

The platen heater 4 is able to heat the recording medium M at a position facing the ink jet head 2 with the platen 11 interposed therebetween. The platen heater 4 is able to heat the recording medium M by a conduction method and may be used if needed in the ink jet recording method.

In addition, the ink jet recording apparatus 1 may also include the pre-heater 7 to heat the recording medium M in advance before the ink is adhered to the recording medium M.

Post-Heating Mechanism

There may also be provided a post-heating mechanism which sufficiently performs heating after the ink adhesion step so as to complete the recording and so that the recorded matter can be used.

The heating heater 5 used in the post-heating mechanism functions to dry and solidify the ink adhered to the recording medium M. Since the heating heater 5 heats the recording medium M on which an image is recorded, moisture and the like contained in the ink are rapidly evaporated and/or scattered, and hence, an ink film is formed by a resin dispersion to be contained in the ink. As described above, the ink film is tightly fixed or adhered onto the recording medium M, that is, an excellent film forming property is obtained, and hence, an image having an excellent high image quality can be obtained in a short time.

Other Structures

The ink jet recording apparatus 1 may also include the cooling fan 6. After the ink recorded on the recording medium M is dried, since the ink on the recording medium M is cooled by the cooling fan 6, an ink coating film which is tightly adhered to the recording medium M can be formed.

At a lower side of the carriage 9, the platen 11 to support the recording medium M, the carriage transfer mechanism 13 to transfer the carriage 9 relative to the recording medium M, and the transport device 14 in the form of a roller to transport the recording medium M in the sub-scanning direction are provided. Operations of the carriage transfer mechanism 13 and the transport device 14 are controlled by the control portion CONT.

Electric Control

Figure 3:
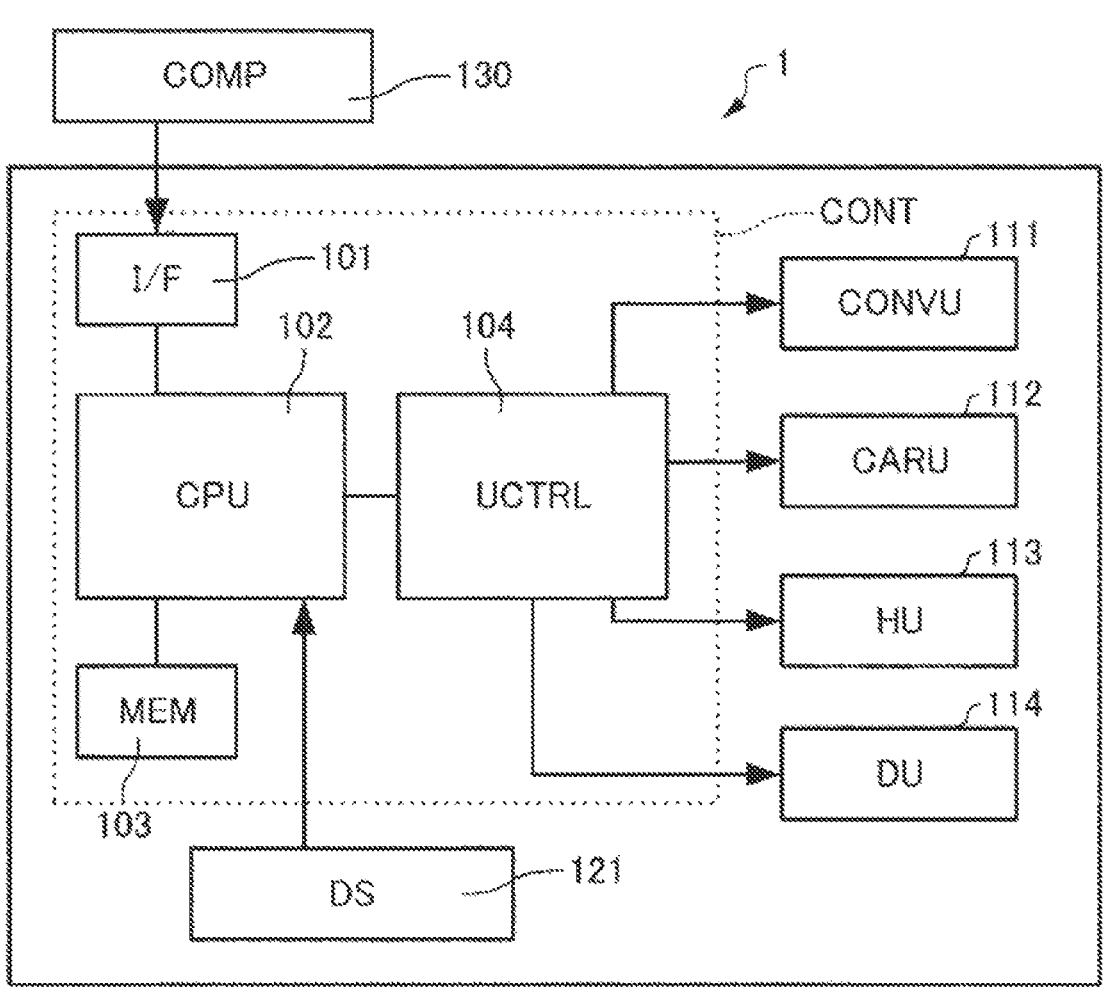
FIG. 3 is a block diagram of the example of the ink jet recording apparatus.

FIG. 3 is a functional block diagram of the ink jet recording apparatus 1. The control portion CONT is a control unit to control the ink jet recording apparatus 1. An interface portion 101 (I/F) functions to send and receive data between a computer 130 (COMP) and the ink jet recording apparatus 1. A CPU 102 is an arithmetic processing device to control the entire ink jet recording apparatus 1. A memory 103 (MEM) is to secure, for example, a region in which a program of the CPU 102 is stored and an operation region thereof. The CPU 102 controls individual units by a unit control circuit 104 (UCTRL). In addition, the status in the ink jet recording apparatus 1 is monitored by a detector group 121 (DS), and based on the detection result thereof, the control portion CONT controls the individual units.

A transport unit 111 (CONVU) controls the sub-scanning (transport) of the ink jet recording and in particular, controls a transport direction and a transport rate of the recording medium M. In more particular, by controlling a rotation direction and a rotation rate of a transport roller driven by a motor, the transport direction and the transport rate of the recording medium M are controlled.

A carriage unit 112 (CARU) controls the main scanning (pass) of the ink jet recording and in particular, reciprocally transfers the ink jet head 2 in the main scanning direction. The carriage unit 112 includes the carriage 9 mounting the ink jet head 2 and the carriage transfer mechanism 13 to reciprocally transfer the carriage 9.

A head unit 113 (HU) controls an ejection amount of the ink and/or the treatment liquid from a nozzle of the ink jet head 2. For example, when the nozzle of the ink jet head 2 is driven by a piezoelectric element, the operation of the piezoelectric element of each nozzle is controlled. By the head unit 113, for example, a timing of adhesion and a dot size of each ink and/or the treatment liquid are controlled. In addition, by combination of controls of the carriage unit 112 and the head unit 113, an adhesion amount of the ink and/or the treatment liquid per one scanning is controlled.

A drying unit 114 (DU) controls the temperatures of various types of heaters, such as the IR heater 3, the pre-heater 7, the platen heater 4, and the heating heater 5.

In the ink jet recording apparatus 1 described above, an operation in which the carriage 9 mounting the ink jet head 2 is transferred in the main scanning direction and a transport operation (sub-scanning) are alternately repeated. In this step, when each pass is performed, the control portion CONT controls the carriage unit 112 to transfer the ink jet head 2 in the main scanning direction and also controls the head unit 113 to eject a liquid droplet of the ink and/or the treatment liquid from a predetermined nozzle hole of the ink jet head 2 so as to adhere the liquid droplet of the ink and/or the treatment liquid to the recording medium M. In addition, the control portion CONT controls the transport unit 111 so that in the transport operation, the recording medium M is transported by a predetermined transport amount (feed amount) in the transport direction.

In the ink jet recording apparatus 1, since the main scanning (pass) and the sub-scanning (transport operation) are repeatedly performed, a recording region to which liquid droplets are adhered is gradually transported. Subsequently, by the heating heater 5, the ink adhered to the recording medium M is dried, so that an image is completed. Next, the recorded matter thus completed may be wound into a roll shape by a winding mechanism or may be transported by a flatbed mechanism.

As the ink jet recording apparatus, besides the serial type ink jet recording apparatus as described above, a line type ink jet recording apparatus may also be used for recording.

EXAMPLES

Hereinafter, although the present disclosure will be described in more detail with reference to Examples, the present disclosure is not limited thereto. Hereinafter, "%" is on a mass basis unless otherwise particularly noted.

3.1. Preparation of Light Ink Composition and Deep Ink Composition

After individual components were charged in a container to obtain one of the compositions shown in the following Tables 1 to 3 and were then stirred and mixed for 2 hours by a magnetic stirrer, filtration was performed using a membrane filter having a pore diameter of 5 μm, so that light ink compositions and deep ink compositions of Examples and Comparative Examples were obtained. The numerical values shown in the following Tables 1 to 3 each indicate "percent by mass", and the pure water was added so that the total mass of the ink composition was 100 percent by mass. In addition, as the pigment dispersion liquid, a dispersion prepared in advance as described below was used. In addition, the numerical values of the pigment dispersion liquid and the water-dispersible resin in the tables each indicate an effective component amount (solid content amount).

Preparation of Pigment Dispersion Liquid

After 50 g of methyl ethyl ketone (MEK) was charged in a flask equipped with a dripping funnel, a nitrogen inlet tube, a reflux cooling tube, a thermometer, and a stirring device, the temperature was increased to 75° C. with nitrogen bubbling.

Into the container described above, a monomer mixture containing 80 g of butyl methacrylate, 50 g of methyl methacrylate, 15 g of styrene, and 20 g of methacrylic acid; 50 g of MEK, and 500 mg of a polymerization initiator (azoisobutyronitrile (AIBN)) were dripped over 3 hours.

After the dripping was finished, reflux heating was further performed for 6 hours, and after cooling, MEK in an amount corresponding to that lost by evaporation was added, so that a resin solution (resin solid content: 50 percent by mass, acid value: 79 mg/KOH, Tg: 65° C.) was obtained.

After a predetermined amount of a sodium hydroxide aqueous solution at a concentration of 20 percent by mass was added as a neutralizer to 20 g of the solution described above to neutralize 100% of a salt generating group, 50 g of a pigment (C.I. Pigment Blue 15: 3) was gradually added thereto with stirring, and kneading was then performed for 2 hours by a bead mill. After 200 g of ion exchange water was added to a kneaded material thus obtained and was then stirred, heating was performed at a reduced pressure, so that MEK was removed. Furthermore, the concentration was adjusted using ion exchange water, so that a pigment dispersion liquid (pigment solid content: 20 percent by mass, resin solid content: 5 percent by weight) was obtained.

3.2. Preparation of Treatment Liquid

After individual components were charged in a container to obtain one of the compositions shown in the following Table 4 and were then mixed and stirred for 2 hours by a magnetic stirrer, filtration was performed using a membrane filter having a pore diameter of 5 μm, so that treatment liquids according to Examples and Comparative Examples were obtained. The numerical values shown in the following Table 4 each indicate "percent by mass", and the pure water was added so that the total mass of the treatment liquid was 100 percent by mass. In addition, the numerical value of the cationic resin in the table indicates an effective component amount (solid content amount).

TABLE 1

| | | | LIGHT INK A | LIGHT INK B | LIGHT INK C | LIGHT INK D |
|---|---|---|---|---|---|---|
| SPECIFIC ALKANEDIOL CONDENSATE | INTERMOLECULAR CONDENSATE (C2-3) BOILING POINT: 250° C. OR LESS | DPG (BOILING POINT: 232° C./C3 CONDENSATE) | 4 | | 10 | 4 |
| | | DEG (BOILING POINT: 244° C./C2 CONDENSATE) | | | | |
| | INTERMOLECULAR CONDENSATE (C2-3) BOILING POINT: 250° C. TO 300° C. | TEG (BOILING POINT: 276° C./C2 CONDENSATE) | | | | |
| | | TPG (BOILING POINT: 270° C./C3 CONDENSATE) | | | | |
| SPECIFIC ALKANEDIOL MONOMER | MONOMER (C2-4) | PG (BOILING POINT: 188° C./C3) | 8 | 12 | | |
| | | EG (BOILING POINT: 197° C./C2) | | | | |
| | | 1,3PD (BOILING POINT: 214° C./C3) | | | | 8 |
| OTHER ALKANEDIOL | MONOMER (C5 OR MORE) | 1,2HD (BOILING POINT: 224° C./C6) | 1 | 1 | 1 | 1 |
| OTHER ORGANIC SOLVENTS (BOILING POINT: 250° C. OR LESS) | AMIDE | 2P (BOILING POINT: 245° C.) | 12 | 12 | 12 | 12 |
| | SULFUR-CONTAINING COMPOUND | DMSO (BOILING POINT: 189° C.) | | | | |
| | CYCLIC ETHER | EOXM (BOILING POINT: 220° C.) | | | | |
| ALKANOLAMINE | ALKANOLAMINE | TIPA | 3 | 3 | 3 | 3 |
| PIGMENT DISPERSION LIQUID | | CYAN PIGMENT (EFFECTIVE COMPONENT) | 1 | 1 | 1 | 1 |
| WATER-DISPERSIBLE RESIN | STYRENE-ACRYLIC BASE | JONCRYL 631 (EFFECTIVE COMPONENT) | 6 | 6 | 6 | 6 |
| | POLYOLEFIN BASE | HITECH E-6500 (EFFECTIVE COMPONENT) | 0.5 | 0.5 | 0.5 | 0.5 |

TABLE 1-continued

| | | | | | | |
|---|---|---|---|---|---|---|
| SURFACTANT | SILICONE BASE | BYK-333 | 0.5 | 0.5 | 0.5 | 0.5 |
| | ACETYLENE BASE | SURFYNOL DF110D | 0.1 | 0.1 | 0.1 | 0.1 |
| PURE WATER | | | BALANCE | BALANCE | BALANCE | BALANCE |
| TOTAL | | | 100 | 100 | 100 | 100 |
| TOTAL AMOUNT OF WATER-SOLUBLE ORGANIC SOLVENTS HAVING BOILING POINT OF 250° C. OR LESS | | | 25 | 25 | 23 | 25 |
| TOTAL AMOUNT OF WATER-SOLUBLE ORGANIC SOLVENTS HAVING BOILING POINT OF MORE THAN 250° C. | | | 0 | 0 | 0 | 0 |
| EVALUATION | | CLOGGING RECOVERY | A | B | AA | AA |

| | | | LIGHT INK E | LIGHT INK F | LIGHT INK G | LIGHT INK H |
|---|---|---|---|---|---|---|
| SPECIFIC ALKANEDIOL CONDENSATE | INTERMOLECULAR CONDENSATE (C2-3) BOILING POINT: 250° C. OR LESS | DPG (BOILING POINT: 232° C./C3 CONDENSATE) | | | | 8 |
| | | DEG (BOILING POINT: 244° C./C2 CONDENSATE) | 4 | | | |
| | INTERMOLECULAR CONDENSATE (C2-3) BOILING POINT: 250° C. TO 300° C. | TEG (BOILING POINT: 276° C./C2 CONDENSATE) | | 4 | | |
| | | TPG (BOILING POINT: 270° C./C3 CONDENSATE) | | | 4 | |
| SPECIFIC ALKANEDIOL MONOMER | MONOMER (C2-4) | PG (BOILING POINT: 188° C./C3) | | | 8 | 4 |
| | | EG (BOILING POINT: 197° C./C2) | 8 | 8 | | |
| | | 1,3PD (BOILING POINT: 214° C./C3) | | | | |
| OTHER ALKANEDIOL | MONOMER (C5 OR MORE) | 1,2HD (BOILING POINT: 224° C./C6) | 1 | 1 | 1 | 1 |
| OTHER ORGANIC SOLVENTS (BOILING POINT: 250° C. OR LESS) | AMIDE | 2P (BOILING POINT: 245° C.) | 12 | 12 | 12 | 12 |
| | SULFUR-CONTAINING COMPOUND | DMSO (BOILING POINT: 189° C.) | | | | |
| | CYCLIC ETHER | EOXM (BOILING POINT: 220° C.) | | | | |
| ALKANOLAMINE | ALKANOLAMINE | TIPA | 3 | 3 | 3 | 3 |
| PIGMENT DISPERSION LIQUID | | CYAN PIGMENT (EFFECTIVE COMPONENT) | 1 | 1 | 1 | 1 |
| WATER-DISPERSIBLE RESIN | STYRENE-ACRYLIC BASE | JONCRYL 631 (EFFECTIVE COMPONENT) | 6 | 6 | 6 | 6 |
| | POLYOLEFIN BASE | HITECH E-6500 (EFFECTIVE COMPONENT) | 0.5 | 0.5 | 0.5 | 0.5 |
| SURFACTANT | SILICONE BASE | BYK-333 | 0.5 | 0.5 | 0.5 | 0.5 |
| | ACETYLENE BASE | SURFYNOL DF110D | 0.1 | 0.1 | 0.1 | 0.1 |
| PURE WATER | | | BALANCE | BALANCE | BALANCE | BALANCE |
| TOTAL | | | 100 | 100 | 100 | 100 |
| TOTAL AMOUNT OF WATER-SOLUBLE ORGANIC SOLVENTS HAVING BOILING POINT OF 250° C. OR LESS | | | 25 | 21 | 21 | 25 |
| TOTAL AMOUNT OF WATER-SOLUBLE ORGANIC SOLVENTS HAVING BOILING POINT OF MORE THAN 250° C. | | | 0 | 4 | 4 | 0 |
| EVALUATION | | CLOGGING RECOVERY | AA | AA | AA | AA |

TABLE 2

| | | | LIGHT INK I | LIGHT INK J | LIGHT INK K | LIGHT INK L |
|---|---|---|---|---|---|---|
| SPECIFIC ALKANEDIOL CONDENSATE | INTERMOLECULAR CONDENSATE (C2-3) BOILING POINT: 250° C. OR LESS | DPG (BOILING POINT: 232° C./C3 CONDENSATE) | 4 | 4 | 4 | 4 |
| | | DEG (BOILING POINT: 244° C./C2 CONDENSATE) | | | | |
| | INTERMOLECULAR CONDENSATE (C2-3) BOILING POINT: 250° C. TO 300° C. | TEG (BOILING POINT: 276° C./C2 CONDENSATE) | | | | |
| | | TPG (BOILING POINT: 270° C./C3 | | | | |

TABLE 2-continued

| | | | | | | |
|---|---|---|---|---|---|---|
| | | CONDENSATE) | | | | |
| SPECIFIC ALKANEDIOL MONOMER | MONOMER (C2-4) | PG (BOILING POINT: 188° C./C3) | 8 | 12 | 8 | 8 |
| | | EG (BOILING POINT: 197° C./C2) | | | | |
| | | 1,3PD (BOILING POINT: 214° C./C3) | | | | |
| OTHER ALKANEDIOL | MONOMER (C5 OR MORE) | 1,2HD (BOILING POINT: 224° C./C6) | 1 | 1 | 1 | 1 |
| OTHER ORGANIC SOLVENTS (BOILING POINT: 250° C. OR LESS) | AMIDE | 2P (BOILING POINT: 245° C.) | 12 | 12 | | |
| | SULFUR-CONTAINING COMPOUND | DMSO (BOILING POINT: 189° C.) | | | 12 | |
| | CYCLIC ETHER | EOXM (BOILING POINT: 220° C.) | | | | 12 |
| ALKANOLAMINE | ALKANOLAMINE | TIPA | 2 | 3 | 3 | 3 |
| PIGMENT DISPERSION LIQUID | | CYAN PIGMENT (EFFECTIVE COMPONENT) | 1 | 1 | 1 | 1 |
| WATER-DISPERSIBLE RESIN | STYRENE-ACRYLIC BASE | JONCRYL 631 (EFFECTIVE COMPONENT) | 6 | 6 | 6 | 6 |
| | POLYOLEFIN BASE | HITECH E-6500 (EFFECTIVE COMPONENT) | 0.5 | 0.5 | 0.5 | 0.5 |
| SURFACTANT | SILICONE BASE | BYK-333 | 0.5 | 0.5 | 0.5 | 0.5 |
| | ACETYLENE BASE | SURFYNOL DF110D | 0.1 | 0.1 | 0.1 | 0.1 |
| PURE WATER | | | BALANCE | BALANCE | BALANCE | BALANCE |
| TOTAL | | | 100 | 100 | 100 | 100 |
| TOTAL AMOUNT OF WATER-SOLUBLE ORGANIC SOLVENTS HAVING BOILING POINT OF 250° C. OR LESS | | | 25 | 29 | 25 | 25 |
| TOTAL AMOUNT OF WATER-SOLUBLE ORGANIC SOLVENTS HAVING BOILING POINT OF MORE THAN 250° C. | | | 0 | 0 | 0 | 0 |
| EVALUATION | | CLOGGING RECOVERY | B | A | B | B |

| | | | LIGHT INK M | LIGHT INK N | LIGHT INK O |
|---|---|---|---|---|---|
| SPECIFIC ALKANEDIOL CONDENSATE | INTERMOLECULAR CONDENSATE (C2-3) BOILING POINT: 250° C. OR LESS | DPG (BOILING POINT: 232° C./C3 CONDENSATE) | 2 | 2 | 4 |
| | | DEG (BOILING POINT: 244° C./C2 CONDENSATE) | | | |
| | INTERMOLECULAR CONDENSATE (C2-3) BOILING POINT: 250° C. TO 300° C. | TEG (BOILING POINT: 276° C./C2 CONDENSATE) | | | |
| | | TPG (BOILING POINT: 270° C./C3 CONDENSATE) | | | |
| SPECIFIC ALKANEDIOL MONOMER | MONOMER (C2-4) | PG (BOILING POINT: 188° C./C3) | 10 | 17 | 8 |
| | | EG (BOILING POINT: 197° C./C2) | | | |
| | | 1,3PD (BOILING POINT: 214° C./C3) | | | |
| OTHER ALKANEDIOL | MONOMER (C5 OR MORE) | 1,2HD (BOILING POINT: 224° C./C6) | 1 | 1 | 1 |
| OTHER ORGANIC SOLVENTS (BOILING POINT: 250° C. OR LESS) | AMIDE | 2P (BOILING POINT: 245° C.) | 12 | 12 | 12 |
| | SULFUR-CONTAINING COMPOUND | DMSO (BOILING POINT: 189° C.) | | | |
| | CYCLIC ETHER | EOXM (BOILING POINT: 220° C.) | | | |
| ALKANOLAMINE | ALKANOLAMINE | TIPA | 3 | 3 | |
| PIGMENT DISPERSION LIQUID | | CYAN PIGMENT (EFFECTIVE COMPONENT) | 1 | 1 | 1 |
| WATER-DISPERSIBLE RESIN | STYRENE-ACRYLIC BASE | JONCRYL 631 (EFFECTIVE COMPONENT) | 6 | 6 | 6 |
| | POLYOLEFIN BASE | HITECH E-6500 (EFFECTIVE COMPONENT) | 0.5 | 0.5 | 0.5 |

TABLE 2-continued

| | | | | | |
|---|---|---|---|---|---|
| SURFACTANT | SILICONE BASE | BYK-333 | 0.5 | 0.5 | 0.5 |
| | ACETYLENE BASE | SURFYNOL DF110D | 0.1 | 0.1 | 0.1 |
| PURE WATER | | | BALANCE | BALANCE | BALANCE |
| | | | | | |
| TOTAL | | | 100 | 100 | 100 |
| TOTAL AMOUNT OF WATER-SOLUBLE ORGANIC SOLVENTS HAVING BOILING POINT OF 250° C. OR LESS | | | 25 | 32 | 25 |
| TOTAL AMOUNT OF WATER-SOLUBLE ORGANIC SOLVENTS HAVING BOILING POINT OF MORE THAN 250° C. | | | 0 | 0 | 0 |
| EVALUATION | | CLOGGING RECOVERY | A | A | A |

TABLE 3

| | | | DEEP INK A | DEEP INK B | DEEP INK C | DEEP INK D | DEEP INK E |
|---|---|---|---|---|---|---|---|
| SPECIFIC ALKANEDIOL CONDENSATE | INTERMOLECULAR CONDENSATE (C2-3) | DPG (BOILING POINT: 232° C./C3 CONDENSATE) | | 1 | | 10 | |
| SPECIFIC ALKANEDIOL MONOMER | MONOMER (C2-4) | PG (BOILING POINT: 188° C./C3) | 12 | 8 | | | 12 |
| | | EG (BOILING POINT: 197° C./C2) | | | 12 | | |
| OTHER ALKANEDIOL | MONOMER (C5 OR MORE) | 1,2HD (BOILING POINT: 224° C./C6) | 1 | 1 | 1 | 1 | 1 |
| OTHER ORGANIC SOLVENT (BOILING POINT: 250° C. OR LESS) | AMIDE | 2P (BOILING POINT: 245° C.) | 12 | 12 | 12 | 12 | 12 |
| ALKANOLAMINE | ALKANOLAMINE | TIPA | 2 | 2 | 2 | 2 | |
| PIGMENT DISPERSION LIQUID | | CYAN PIGMENT (EFFECTIVE COMPONENT) | 4 | 4 | 4 | 4 | 4 |
| RESIN | STYRENE-ACRYLIC BASE | JONCRYL 631 (EFFECTIVE COMPONENT) | 6 | 6 | 6 | 6 | 6 |
| | POLYOLEFIN BASE | HITECH E-6500 (EFFECTIVE COMPONENT) | 0.5 | 0.5 | 0.5 | 0.5 | 0.5 |
| SURFACTANT | SILICONE BASE | BYK-333 | 0.5 | 0.5 | 0.5 | 0.5 | 0.5 |
| | ACETYLENE BASE | SURFYNOL DF110D | 0.1 | 0.1 | 0.1 | 0.1 | 0.1 |
| PURE WATER | | | BALANCE | BALANCE | BALANCE | BALANCE | BALANCE |
| | | | | | | | |
| TOTAL | | | 100 | 100 | 100 | 100 | 100 |
| TOTAL AMOUNT OF WATER-SOLUBLE ORGANIC SOLVENTS HAVING BOILING POINT OF 250° C. OR LESS | | | 25 | 22 | 25 | 23 | 25 |
| TOTAL AMOUNT OF WATER-SOLUBLE ORGANIC SOLVENTS HAVING BOILING POINT OF MORE THAN 250° C. | | | 0 | 2 | 0 | 2 | 0 |
| EVALUATION | | CLOGGING RECOVERY | B | A | B | B | B |

TABLE 4

| | | | TREATMENT LIQUID A | TREATMENT LIQUID B | TREATMENT LIQUID C |
|---|---|---|---|---|---|
| ORGANIC SOLVENT | ALKANEDIOL | PG (BOILING POINT: 188° C.) | 15 | 15 | 15 |
| | | 1,2HD (BOILING POINT: 224° C.) | 1 | 1 | 1 |
| | AMIDE | 2P (BOILING POINT: 245° C.) | 5 | 5 | 5 |
| ALKANOLAMINE | ALKANOLAMINE | TIPA | 0.1 | 0.1 | |
| AGGREGATING AGENT | DICARBOXYLIC ACID (ORGANIC SALT) | SUCCINIC ACID | | | 5 |
| | POLYVALENT METAL SALT | MAGNESIUM SULFATE | 5 | | |
| | CATIONIC RESIN | CATIOMASTER PD-7 (EFFECTIVE COMPONENT) | | 3 | |

TABLE 4-continued

| | | | TREATMENT LIQUID A | TREATMENT LIQUID B | TREATMENT LIQUID C |
|---|---|---|---|---|---|
| SURFACTANT | SURFACTANT | BYK-333 | 0.5 | 0.5 | 0.5 |
| | | SURFYNOL DF110D | 0.1 | 0.1 | 0.1 |
| PURE WATER | | | BALANCE | BALANCE | BALANCE |
| TOTAL | | | 100 | 100 | 100 |

The descriptions of the above Tables 1 to 4 will be further described.

Technical Terms

"Specific Alkanediol Condensate": organic solvent which is a condensate of an alkanediol having 2 or 3 carbon atoms and which has two hydroxy groups.

"Specific Alkanediol Monomer": organic solvent which is an alkanediol having 2 to 4 carbon atoms.

"C3 Condensate": intermolecular condensate of an alkanediol having 3 carbon atoms.

"C2 Condensate": intermolecular condensate of an alkanediol having 2 carbon atoms.

"Boiling Point": standard boiling point.

Components

Specific Alkanediol Condensate
"DPG": dipropylene glycol
"DEG": diethylene glycol
"TEG": triethylene glycol
"TPG": tripropylene glycol Specific Alkanediol Monomer
"PG": propylene glycol
"EG": ethylene glycol
"1,3PD": 1,3-propanediol Other Alkanediol
"1,2HD": 1,2-hexanediol Other Organic Solvent
"2P": 2-pyrrolidone
"DMSO": dimethylsulfoxide
"EOXM": 3-ethyl-3-oxetanemethanol Alkanolamine
"TIPA": triisopropanolamine, standard boiling point: 301° C., solid at ordinary temperature Pigment Dispersion Liquid
"Cyan Pigment": C.I. Pigment blue 15: 3

Water-Dispersible Resin
"Joncryl 631": trade name, resin emulsion, styrene-acrylic resin, Tg: 105° C., manufactured by BASF Japan Ltd.
"Hitech E-6500": trade name, wax emulsion, polyethylene-based wax, manufactured by Toho Chemical Industry Co., Ltd.

Surfactant
"BYK-333": trade name, silicone-based surfactant, manufactured by BYK Japan KK
"Surfynol DF110D": trade name, acetylenediol-based surfactant, manufactured by Nisshin Chemical Industry Co., Ltd.

Aggregating Agent
"Catiomaster PD-7": trade name, amine/epichlorohydrin copolymer, manufactured by Yokkaichi Chemical Company Limited.

3.3. Printing Conditions

Printing conditions of an evaluation test were set as described below.

Printing Conditions
Printing machine: "SC-R5050", trade name, manufactured by Seiko Epson Corporation
Resolution: 1,200×1,200 dpi
Adhesion amount: deep ink composition (10 mg/inch$^2$), light ink composition (5 mg/inch$^2$), treatment liquid (1 mg/inch$^2$)
Printing pattern: solid pattern (mixture of cyan and light cyan)
Number of scannings: 9 times
Platen heating temperature: 40° C.
Post-heating temperature: 80° C.
Recording medium: "Orajet 3165G-010", trade name, vinyl chloride film, manufactured by Orafol Japan Inc.
Platen gap: 1.7 mm After the deep ink composition, the light ink composition, and the treatment liquid obtained as described above were filled in "SC-R5050", and the recording medium was set therein, a light-deep mixed solid pattern was printed on the recording medium under the printing conditions described above. In addition, in the test performed in Comparative Example 3, the treatment liquid was not used.

Under the printing conditions described above, an adhesion amount ratio of the deep ink composition to the light ink composition was set to (deep ink composition:light ink composition)=(2:1). In addition, the platen heating temperature indicates a surface temperature of the recording medium in a primary heating step. As is the case described above, the post-heating temperature indicates a surface temperature of the recording medium in a post-heating step.

TABLE 5

| | EXAMPLE 1 | EXAMPLE 2 | EXAMPLE 3 | EXAMPLE 4 | EXAMPLE 5 |
|---|---|---|---|---|---|
| LIGHT INK | LIGHT INK A | LIGHT INK D | LIGHT INK E | LIGHT INK F | LIGHT INK G |
| DEEP INK | DEEP INK A | DEEP INK A | DEEP INK C | DEEP INK C | DEEP INK A |
| TREATMENT LIQUID | TREATMENT LIQUID A | TREATMENT LIQUID A | TREATMENT LIQUID A | TREATMENT LIQUID A | TREATMENT LIQUID A |
| IMAGE QUALITY (AGGREGATION IRREGULARITY) | A | A | A | A | A |

TABLE 5-continued

| | | | | | |
|---|---|---|---|---|---|
| LANDING DEVIATION | A | A | A | A | A |
| ABRASION RESISTANCE | A | B | B | C | C |

| | EXAMPLE 6 | EXAMPLE 7 | EXAMPLE 8 | EXAMPLE 9 | EXAMPLE 10 |
|---|---|---|---|---|---|
| LIGHT INK | LIGHT INK H | LIGHT INK I | LIGHT INK J | LIGHT INK K | LIGHT INK L |
| DEEP INK | DEEP INK A | DEEP INK A | DEEP INK A | DEEP INK A | DEEP INK A |
| TREATMENT LIQUID | TREATMENT LIQUID A | TREATMENT LIQUID A | TREATMENT LIQUID A | TREATMENT LIQUID A | TREATMENT LIQUID A |
| IMAGE QUALITY (AGGREGATION IRREGULARITY) | AA | B | A | A | A |
| LANDING DEVIATION | B | AA | A | A | A |
| ABRASION RESISTANCE | B | A | B | B | B |

| | EXAMPLE 11 | EXAMPLE 12 | EXAMPLE 13 | EXAMPLE 14 | EXAMPLE 15 | EXAMPLE 16 |
|---|---|---|---|---|---|---|
| LIGHT INK | LIGHT INK C | LIGHT INK M | LIGHT INK N | LIGHT INK O | LIGHT INK A | LIGHT INK A |
| DEEP INK | DEEP INK A | DEEP INK A | DEEP INK A | DEEP INK E | DEEP INK B | DEEP INK A |
| TREATMENT LIQUID | TREATMENT LIQUID A | TREATMENT LIQUID A | TREATMENT LIQUID A | TREATMENT LIQUID A | TREATMENT LIQUID A | TREATMENT LIQUID B |
| IMAGE QUALITY (AGGREGATION IRREGULARITY) | AA | B | B | B | AA | A |
| LANDING DEVIATION | B | B | B | A | B | A |
| ABRASION RESISTANCE | C | AA | C | A | B | A |

| | EXAMPLE 17 | COMPARATIVE EXAMPLE 1 | COMPARATIVE EXAMPLE 2 | COMPARATIVE EXAMPLE 3 |
|---|---|---|---|---|
| LIGHT INK | LIGHT INK A | LIGHT INK B | LIGHT INK A | LIGHT INK A |
| DEEP INK | DEEP INK A | DEEP INK A | DEEP INK D | DEEP INK A |
| TREATMENT LIQUID | TREATMENT LIQUID C | TREATMENT LIQUID A | TREATMENT LIQUID A | — |
| IMAGE QUALITY (AGGREGATION IRREGULARITY) | B | C | AA | C |
| LANDING DEVIATION | A | AA | C | A |
| ABRASION RESISTANCE | B | AA | C | AA |

3.4. Evaluation Method

As evaluation items, the image quality (aggregation irregularity), the landing deviation, the abrasion resistance, and the clogging recovery property were evaluated by the following evaluation tests. The evaluation methods are as described below.

3.4.1. Image Quality (Aggregation Irregularity)

After the recording medium was set, and a deep-light mixed solid pattern was printed under the printing conditions described above, a printed matter thus obtained was observed by visual inspection and was evaluated by the following evaluation criteria.

Evaluation Criteria

AA: No aggregation irregularity is observed.

A: Although being observed, aggregation irregularity is not apparent.

B: Although being apparent, aggregation irregularity is acceptable.

C: Aggregation irregularity is apparent (NG).

3.4.2. Landing Deviation

After the recording medium was set, a nozzle check pattern was recorded under the printing conditions described above immediately after flushing was performed, so that normal ejection was confirmed. Subsequently, at a platen temperature of 40° C., idle running was performed for 20 seconds without ink ejection, and a nozzle check pattern similar to that described above was recorded. The landing deviations of the deep ink and the light ink after the idle running were compared to each other and were evaluated by the following criteria. In addition, the landing deviation was obtained as the average of deviations at all nozzles. However, no-ejection nozzles were excluded. Before the idle running, an ejection timing between the deep ink and the light ink was adjusted so that the landing positions were configured not to deviate from each other, and under the ejection timing condition thus adjusted, the recording was performed.

Evaluation Criteria

AA: Landing positions are not different between deep and light inks.

A: Half of inter nozzle distance or less is deviated between deep and light inks.

B: Inter nozzle distance or less is deviated between deep and light inks.

C: More than inter nozzle distance is deviated between deep and light inks.

3.4.3. Abrasion Resistance

After a solid pattern was printed on the recording medium under the printing conditions described above and was then left for 30 minutes at room temperature, a solid pattern printed portion was cut into a rectangular shape of 30×150 mm and was rubbed 100 times with a plain-woven cloth using a Gakushin-type fastness rubbing tester (load: 500 g), and a peeling degree of the ink was evaluated by visual inspection.

Evaluation Criteria

AA: No peeling is observed.

A: Less than 20% of evaluation area is peeled off.

B: Less than 50% of evaluation area is peeled off.

C: 50% or more of evaluation area is peeled off.

3.4.4. Clogging Recovery Property

Under the printing conditions described above, no-ejection was intentionally generated in a nozzle. Under the condition described above, idle running was performed for 3 hours under the temperature conditions described in the above printing conditions. After the recording was performed, cleaning was performed 3 times, and finally, the number of missing nozzles was evaluated by the following evaluation criteria. By one cleaning, 0.5 g of the ink was ejected from a nozzle line. In addition, the no-ejection in the nozzle was generated by patting a nozzle surface with a Bemcot cloth wet with water. In addition, the nozzle line was formed from 400 nozzles.

Evaluation Criteria

AA: No-ejection nozzles are not confirmed.

A: No-ejection nozzles are less than 3%.

B: No-ejection nozzles are 3% to less than 5%.

C: No-ejection nozzles are 5% or more.

3.5. Evaluation Results

The evaluation results are shown in the above Table 5 and Tables 1 and 2.

By comparison between Examples and Comparative Examples, it was found that in all Examples of the ink set and the recording method according to this embodiment, an excellent image quality is obtained, and in addition, the landing deviation can be significantly reduced. On the other hand, it was found that in all Comparative Examples not according to this embodiment, one of the image quality and the reduction in landing deviation is inferior.

By comparison between Example 1 and Comparative Examples 1 and 2, it was found that when the light ink composition contains the specific condensate, and the deep ink composition contains the specific monomer, an excellent image quality is obtained, and in addition, the landing deviation can be significantly reduced.

In addition, by comparison between Example 1 and Comparative Example 3, it was found that in order t obtain an excellent image quality, the treatment liquid containing an aggregating agent is necessary.

From the results of Examples 1, 2, and 3, it was found that when the specific monomer contained in the light ink composition is propylene glycol, a more excellent abrasion resistance is obtained.

From the results of Examples 1, 4, and 5, it was found that when the organic solvent having a standard boiling point of more than 250° C. is not contained at more than a predetermined amount, a more excellent abrasion resistance is obtained.

From the results of Examples 1 and 6, it was found that in the case in which the light ink composition may contain the specific monomer, when the content of the specific condensate is lower than the content of the specific monomer, the image quality, the landing deviation, and the abrasion resistance can be made excellent with a good balance.

From the results of Examples 1 and 7, it was found that in the case in which the light ink composition may contain an alkanolamine, when the content of the alkanolamine in the light ink composition is higher than the content of the alkanolamine in the deep ink composition, the image quality and the landing deviation can be made excellent with a good balance.

In addition, from the results of Examples 1 and 14, it was found that when the ink composition contains an alkanolamine, the image quality is made more preferable.

From the results of Examples 1, 9, and 10, it was found that in the case in which the low molecular weight organic compound may be contained, when the low molecular weight organic compound is formed from an amide, the abrasion resistance and the clogging recovery property are made more preferable.

From the results of Examples 1, 11, and 12, it was found that when the light ink composition contains the specific monomer, the image quality, the landing deviation, and the abrasion resistance can be made preferable with a good balance.

From the results of Examples 1, 8, and 13, it was found that when the content of the organic solvent having a standard boiling point of 250° C. or less is a predetermined amount or less, the image quality, the landing deviation, and the abrasion resistance can be made preferable with a good balance.

From the results of Examples 1 and 15, it was found that when the specific condensate is not contained in the deep ink composition, the image quality, the landing deviation, and the abrasion resistance can be made preferable with a good balance.

From the results of Examples 1, 16, and 17, it was found that various types of aggregating agents may be contained in the treatment liquid.

From the embodiments described above, the following conclusions are obtained.

An ink set according to an aspect comprises: a treatment liquid containing an aggregating agent; a deep ink composition; and a light ink composition, the ink compositions containing colorants, belonging to the same color system, and each being a water-based ink jet ink. In this ink set described above, the light ink composition contains an organic solvent which is a condensate of an alkanediol having 2 or 3 carbon atoms and which has two hydroxy groups, and the deep ink composition contains an organic solvent which is an alkanediol having 2 to 4 carbon atoms.

In the ink set according to the above aspect, the light ink composition may further contain an organic solvent which is an alkanediol having 2 to 4 carbon atoms, and a content of the organic solvent which is a condensate of an alkanediol having 2 or 3 carbon atoms and which has two hydroxy groups may be lower than a content of the organic solvent which is an alkanediol having 2 to 4 carbon atoms.

In the ink set according to the above aspect, the organic solvent contained in the light ink composition, which is the condensate of an alkanediol having 2 or 3 carbon atoms and which has two hydroxy groups, and the organic solvent contained in the deep ink composition, which is the alkanediol having 2 to 4 carbon atoms, each may have a standard boiling point of 150° C. to 300° C.

In the ink set according to the above aspect, the light ink composition may be configured not to contain an organic solvent which is an alkanediol having 2 to 4 carbon atoms at a content more than a content of the organic solvent which is an alkanediol having 2 to 4 carbon atoms in the deep ink composition.

In the ink set according to the above aspect, the deep ink composition may be configured not to contain an organic solvent which is a condensate of an alkanediol having 2 or 3 carbon atoms and which has two hydroxy groups at a content more than a content of the organic solvent which is a condensate of an alkanediol having 2 or 3 carbon atoms and which has two hydroxy groups in the light ink composition.

In the ink set according to the above aspect, the deep ink composition and the light ink composition each may contain an alkanolamine, and a content of the alkanolamine in the light ink composition may be higher than a content of the alkanolamine in the deep ink composition.

In the ink set according to the above aspect, the deep ink composition and the light ink composition each may contain an organic solvent having a standard boiling point of 250° C. or less at a content of 10 to 30 percent by mass with respect to a total mass of the composition and each may be configured not to contain an organic solvent having a standard boiling point of more than 250° C. at a content of more than 8 percent by mass with respect to the total mass of the composition.

In the ink set according to the above aspect, the deep ink composition and the light ink composition each may contain a low molecular weight organic compound which has a standard boiling point of 150° C. to 300° C. and which is one of an amide, a sulfur-containing compound, and a cyclic ether.

In the ink set according to the above aspect, the deep ink composition and the light ink composition each may contain a resin dispersion formed from one of an acrylic-based resin, a polyurethane-based resin, a polyester-based resin, and a polyolefin-based resin.

In the ink set according to the above aspect, the ink set may be used for recording on a low-absorbing recording medium or a non-absorbing recording medium.

A recording method according to another aspect which uses the ink set according to the above aspect, comprises: a step of adhering the treatment liquid to a recording medium; and a step of adhering the light ink composition and the deep ink composition to the recording medium by an ink jet method.

The recording method according to the above aspect may further comprise a primary heating step of heating the light ink composition and the deep ink composition adhered to the recording medium, and the recording medium may have a surface temperature of 28° C. to 45° C. in the primary heating step.

The present disclosure is not limited to the embodiments described above and may be variously changed and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A recording method using an ink set that contains a treatment liquid containing an aggregating agent; a deep ink composition; and a light ink composition, wherein the ink compositions each contain a colorant that belongs to the same color system, each of the ink compositions is a water-based ink jet ink; and wherein the light ink composition contains an organic solvent which is a condensate of an alkanediol having 2 or 3 carbon atoms and which has two hydroxy groups, and the deep ink composition contains an organic solvent which is an alkanediol having 2 to 4 carbon atoms, the method comprising:

adhering the treatment liquid to a recording medium; and adhering the light ink composition and the deep ink composition to the recording medium by an ink jet method, wherein the light ink composition further contains an organic solvent which is an alkanediol having 2 to 4 carbon atoms, wherein a content of the organic solvent which is a condensate of an alkanediol having 2 or 3 carbon atoms and which has two hydroxy groups contained in the light ink composition is lower than a content of the organic solvent which is an alkanediol having 2 to 4 carbon atoms contained in the light ink composition, and wherein a content of the organic solvent which is the alkanediol having 2 to 4 carbon atoms contained in the light ink composition is lower than a content of the alkanediol having 2 to 4 carbon atoms contained in the deep ink composition.

2. The recording method according to claim 1, wherein the content of the organic solvent which is the condensate of the alkanediol having 2 or 3 carbon atoms and which has two hydroxy groups contained in the light ink composition is lower than the content of the organic solvent which is the alkanediol having 2 to 4 carbon atoms contained in the light ink composition by 1 percent by mass or more.

3. The recording method according to claim 1, wherein the organic solvent contained in the light ink composition, which is the condensate of an alkanediol having 2 or 3 carbon atoms and which has two hydroxy groups, and the organic solvent contained in the deep ink composition, which is the alkanediol having 2 to 4 carbon atoms, each have a standard boiling point of 150° C. to 300° C.

4. The recording method according to claim 1, wherein a content of the organic solvent which is an alkanediol having 2 or 4 carbon atoms contained in the light ink composition is 1 to 20 percent with respect to the total mass of the light ink composition.

5. The recording method according to claim 1, wherein the deep ink composition is configured not to contain an organic solvent which is a condensate of an alkanediol having 2 or 3 carbon atoms and which has two hydroxy groups at a content more than a content of the organic solvent which is a condensate of an alkanediol having 2 or 3 carbon atoms and which has two hydroxy groups in the light ink composition.

6. The recording method according to claim 1, wherein the deep ink composition and the light ink composition each contain an alkanolamine, and a content of the alkanolamine in the light ink composition is higher than a content of the alkanolamine in the deep ink composition.

7. The recording method according to claim 1, wherein the deep ink composition and the light ink composition each contain an organic solvent having a standard boiling point of 250° C. or less at a content of 10 to 30 percent by mass with respect to a total mass of each respective composition and are each configured not to contain an organic solvent having a standard boiling point of more than 250° C. at a content of more than 8 percent by mass with respect to the total mass of each respective composition.

8. The recording method according to claim 1, wherein the deep ink composition and the light ink composition each contain a low molecular weight organic compound which has a standard boiling point of 150° C. to 300° C. and which is one of an amide, a sulfur-containing compound, and a cyclic ether.

9. The recording method according to claim 1, wherein the deep ink composition and the light ink composition each contain a resin dispersion formed from one of an acrylic-based resin, a polyurethane-based resin, a polyester-based resin, and a polyolefin-based resin.

10. The recording method according to claim 1, wherein the recording medium is a low-absorbing recording medium or a non-absorbing recording medium.

11. The recording method according to claim 1, further comprising:

a primary heating step of heating the light ink composition and the deep ink composition adhered to the recording medium, wherein the recording medium has a surface temperature of 28° C. to 45° C. in the primary heating step.

\*  \*  \*  \*  \*